(12) United States Patent
Nagura et al.

(10) Patent No.: US 6,564,549 B2
(45) Date of Patent: May 20, 2003

(54) DISPLACEMENT CONTROL DEVICE FOR HYDRAULIC PUMP AND BRAKE CONTROL DEVICE FOR HYDRAULIC MOTOR

(75) Inventors: Shinobu Nagura, Oyama (JP); Seita Hayashi, Oyama (JP)

(73) Assignee: Komatsu Ltd., Tokyo (JP)

( * ) Notice: Subject to any disclaimer, the term of this patent is extended or adjusted under 35 U.S.C. 154(b) by 31 days.

(21) Appl. No.: 09/871,808

(22) Filed: Jun. 4, 2001

(65) Prior Publication Data

US 2001/0049318 A1 Dec. 6, 2001

(30) Foreign Application Priority Data

Jun. 5, 2000 (JP) .......................... 2000-167645

(51) Int. Cl.⁷ .............................. F16D 31/02
(52) U.S. Cl. ............................ 60/436; 60/445
(58) Field of Search ..................... 60/436, 442, 445, 60/468, 399

(56) References Cited

U.S. PATENT DOCUMENTS 4,495,767 A * 1/1985 Akiyama et al. ............. 60/436
5,467,598 A * 11/1995 Welscher .................... 60/436

* cited by examiner

Primary Examiner—Edward K. Look
Assistant Examiner—Thomas E. Lazo
(74) Attorney, Agent, or Firm—Varndell & Varndell, PLLC

(57) ABSTRACT

In a direct drive type hydraulic pump, the displacement of the hydraulic pump is forcedly changed to a desired displacement according to an instruction of a channel different from a usual instruction, thereby changing to a desired displacement quickly with good responsivity. When an emergency brake switch is turned on, an emergency brake signal is entered an emergency brake control valve. Thus, an emergency brake signal pressure is entered a piston through an emergency brake signal oil passage, and a piston is forcedly positioned in a neutral position. In other words, the piston can be forcedly positioned in the neutral position according to the emergency brake signal regardless of the entry of a usual brake signal. Therefore, the displacement of the hydraulic pump can be forcedly changed to the neutral position (minimum displacement).

3 Claims, 18 Drawing Sheets

DISPLACEMENT CONTROL DEVICE FOR HYDRAULIC PUMP AND BRAKE CONTROL DEVICE FOR HYDRAULIC MOTOR

BACKGROUND OF THE INVENTION

1. Field of the Invention

The present invention relates to a device which controls the displacement of a hydraulic pump and a brake control device which controls to brake a hydraulic motor by controlling the displacement of the hydraulic pump, and more particularly to a device which is applied to the hydraulic pump which is not provided with a feedback servo valve.

2. Description of the Related Art

The displacement of the hydraulic pump can be controlled by two methods. One of them is a method to control the displacement by feeding back the present displacement of the hydraulic pump by the feedback control valve. It is called a servo method.

The other is a direct control method which is not provided with a feedback control valve. Operation of a hydraulic pump of the direct control method will be described with reference to the hydraulic circuit of FIG. 17.

FIG. 17 shows a closed circuit which is comprised of hydraulic pump 11 and hydraulic motor 12. For example, it is assumed that a vehicle is driven by rotating crawler belts (or wheels) 13 by the hydraulic motor 12.

When operation lever 14a is operated, a pilot pressure oil with a pilot pressure corresponding to the operated amount is supplied to piston 15 for controlling the displacement. The pilot pressure oil is supplied by pilot pump 16 used as oil pressure source. The displacement control piston 15 is connected to a swash plate, namely locker cam 11a, of the hydraulic pump 11. The displacement control piston 15 moves to a position according to the pilot pressure. When the displacement control piston 15 moves, the swash plate 11a of the hydraulic pump 11 is tilted. The hydraulic pump 11 is changed to have a displacement corresponding to the operated amount of the operation lever 14a. The pressure oil delivered from the hydraulic pump 11 is delivered to the hydraulic motor 12, and the hydraulic motor 12 is driven to rotate. When the hydraulic motor 12 is driven to rotate, the crawler belts 13 connected to shaft 12a of the hydraulic motor 12 are rotated.

The hydraulic pump 11 is easily influenced by a tilting moment because it does not have a feedback servo valve. This function that the hydraulic pump 11 is influenced easily by the tilting moment is used to control pump absorption torque and to control for preventing a shock involved in starting or stopping motion of a vehicle.

In the hydraulic pump 11 of the direct control method, the tilting moment corresponding to the pump pressure acts on the locker cam to change the pump displacement. This is achieved by a shape of a delivery port of the valve plate of the hydraulic pump 11.

The hydraulic pump 11 for a closed circuit has a port shape allowing to deliver from both delivery ports 11b, 11c. This port shape is suitable for delivering a high pressure oil but not suitable for sucking a low pressure oil. To raise the pressure of the suction side of the hydraulic pump 11, it is necessary to make supplemental supply of the pressure oil to the suction side port of the hydraulic pump 11. It is not illustrated but for example a charge circuit for discharging the pressure oil of about 3 MPa from the charge pump is generally disposed. The pressure supplied to the hydraulic pump 11 is sufficient in about 1 to 1.5 MPa. But, a charge pump for discharging a pressure of about 3 MPa is used because the charge pump is often used also as an oil pressure source of the pilot circuit.

The charge circuit is comprised of the charge pump, a charge relief valve for setting a charge pressure, and two sets of suction valves (check valves) for supplying the charge pressure to a low-pressure side port of the hydraulic pump 11, namely to a low-pressure side oil passage.

The closed circuit shown in FIG. 17 is provided with two sets of safety valves in order to prevent equipment from being broken resulting from an excessive increase in pressure within the oil passage. A suction safety valve which has the safety valve and the suction valve (check valve) combined into one body is often used.

It is assumed that a vehicle is started forward. When the vehicle starts to move, the pressure oil is sucked from oil passage 10R into the port 11b of the hydraulic pump 11 and then delivered from the port 11c to oil passage 10F. The delivery side oil passage 10F has a pressure higher than the intake side oil passage 10R. It is when the hydraulic pump 11 is pumping. The hydraulic pump 11 is designed to have a characteristic that the swash plate 11a is returned toward a neutral position as the delivery side oil passage 10F has a higher pump pressure. In other words, the tilting moment corresponding to the pump pressure on the delivery side acts on the locker cam to return the swash plate 11a to the neutral position, so that the displacement of the hydraulic pump 11 becomes small as the pump pressure on the delivery side becomes high.

Thus, when the vehicle starts to move and the delivery pressure increases, the pump displacement can be reduced. Specifically, the pump displacement to an instruction value is delayed from changing to the maximum side to prevent the pump pressure from increasing sharply, thereby limiting the torque output by the hydraulic motor 12. Accordingly, the shock caused when the vehicle starts to move can be lowered.

The same is also applied to a case of stopping the vehicle.

When the vehicle is to be stopped, the oil passage 10R on the intake side has a pressure higher than that of the delivery side oil passage 10F. It is when the hydraulic motor 12 is pumping. The hydraulic pump 11 is provided with a characteristic that the swash plate 11a is raised to the maximum displacement side as the suction side oil passage 10R has a higher pump pressure. Specifically, the tilting moment according to the intake side pump pressure acts on the locker cam to raise the swash plate 11a to the maximum displacement side, so that the hydraulic pump 11 has a larger displacement as the intake side pump pressure becomes higher.

The operation when the vehicle is braking will be described specifically.

To apply the hydraulic brake to the hydraulic motor 12, a flow rate which the hydraulic pump 11 sucks in through the port 11b can be reduced with respect to the flow rate that the hydraulic motor 12 discharges.

When the operation lever 14a is returned to the neutral or the brake pedal is depressed while the vehicle is moving forward, the piston 15 is about to return to the neutral by the spring force.

Thus, the pressure oil flowing through the oil passage 10R is stopped by the hydraulic pump 11 and its pressure is increased to brake the hydraulic motor 12. When the pressure of the oil passage 10R is increased, the displacement of the hydraulic pump 11 is increased by the tilting moment, and the flow rate taken in by the hydraulic pump 11 through the port 11b is increased. Therefore, the pressure oil which was stopped by the hydraulic pump 11 flows out, and the pressure becomes. A braking torque is prevented from becoming excessive by the above operation.

If braking is effective, the speed of the vehicle lowers, and the rotating speed of the hydraulic motor 12 lowers, too. When the rotating speed of the hydraulic motor 12 lowers, the flow rate discharged from the hydraulic motor 12 is decreased, and a brake pressure decreases. When the brake pressure lowers, the tilting moment becomes small, and the piston 15 can be moved in the neutral direction by the spring force. Here, the flow rate to be taken in becomes smaller than that discharged from the hydraulic motor 12, and the brakes are applied continuously.

The piston 15 gradually returns to the neutral while keeping such a balance.

When the piston 15 has returned to the neutral while keeping the balance, it means that the flow rate discharged by the hydraulic motor 12 has become zero and the vehicle has stopped.

Thus, when the suction side pressure (brake pressure) rises and the braking torque increases while the vehicle is braking, the pump displacement can be increased, so that the braking torque can be decreased. In other words, the pump displacement to the instruction value is delayed from becoming minimum, so that the braking torque can be prevented from becoming excessive, and a shock caused while the vehicle is braking can be decreased.

Japanese Patent Laid-Open Publication No. 10-184906 describes an invention related to a hydraulic pump of direct control method.

On the other hand, a hydraulic pump provided with a feedback servo valve has a displacement of the same size as that instructed by the operating lever 14a. Therefore, a separate modulation circuit or the like is necessary to reduce a shock. And, a separate absorption torque control valve or the like is necessary to limit the torque.

But, sometimes a characteristic of the hydraulic pump of the direct control method is an obstacle to the braking of the vehicle.

Specifically, while the vehicle is braking, the pump displacement becomes large and the braking torque becomes small as the suction side pump pressure (brake pressure) increases. Therefore, it takes time to return the displacement of the hydraulic pump 11 to the neutral position (displacement zero), resulting in a disadvantage that braking time and braking distance become long. In other words, when it is necessary to make an emergency stop, there was often a problem that the displacement of the hydraulic pump did not return to the neutral position with good responsivity.

The present invention has a first object to change the displacement of a hydraulic pump of the direct control method to a desired displacement quickly with good responsivity by changing the displacement of the hydraulic pump to a desired displacement forcefully according to an instruction given independent of a usual instruction.

There are two ways to brake the hydraulic motor 12. One of them is to stop the hydraulic motor 12 by setting the displacement of the hydraulic pump 11 to a neutral position to cut off the pressure oil discharged from the hydraulic motor 12 so to operate the hydraulic brakes. A discharge pressure of the hydraulic motor 12 is increased, so that a braking force is applied to the hydraulic motor 12. It is called a hydraulic brake. The other method is to stop the hydraulic motor 12 by fixing the shaft 12a of the hydraulic motor 12 by a frictional force of braking member 17. It is called a mechanical brake.

FIG. 18 shows a brake characteristic when driving down a hill. The horizontal axis indicates elapsed time t after giving a braking instruction. And, the vertical axis indicates a vehicle speed.

In FIG. 8, A indicates a characteristic of braking by the hydraulic pump of a conventional direct control method.

According to the direct control method, the hydraulic brake takes a long braking time as described above. Therefore, the braking time is decreased by operating the mechanical brake at time t1 while the hydraulic brake is operating.

But, there is a problem that a heat load become high because the shaft 12a of the hydraulic motor 12 rotating at a high speed is forcedly fixed by the braking member 17. Besides, a large-capacity mechanical brake is needed to stop the shaft 12a of the hydraulic motor 12 rotating at a high speed. Therefore, there is a drawback that the mechanical brake becomes large in size.

The mechanical brake is generally built in a housing of the hydraulic motor 12.

When the mechanical brake is operated while the shaft 12a of the hydraulic motor 12 is rotating at a high speed, wear powder produced by friction is dispersed within the motor housing. Therefore, the parts such as a sealing material in the motor housing are adversely affected, possibly resulting in deteriorating durability of the hydraulic moor 12.

It is a second object of the invention to improve the durability to prevent a heat load from increasing and to reduce the displacement of the mechanical brake by operating the mechanical brake after finish operating the hydraulic brake.

Besides, it is a third object of the invention to further reduce the displacement of the mechanical brake by forcedly changing the displacement of the hydraulic pump 11 to the neutral position according to an instruction for emergency braking to apply the hydraulic brake quickly with good responsivity and operating the mechanical brake after finish operating the hydraulic brake.

SUMMARY OF THE INVENTION

In order to achieve the first object, a first aspect of the invention is a displacement control device for a hydraulic pump which is provided with a displacement control valve (8) for changing a volume of pressure oil delivered from a hydraulic pump (11) in response to a first instruction signal, and controls the volume of pressure oil delivered from the hydraulic pump (11) by entering the first instruction signal into the displacement control valve (8), wherein:

displacement control means (21, 23, 6) are disposed to control to discharge from the hydraulic pump the pressure oil in a volume corresponding to a second instruction signal regardless of the input of the first instruction signal (11) by entering the second instruction signal different from the first instruction signal.

The first aspect of the invention will be described specifically with reference to FIG. 1.

According to the first aspect of the invention, when emergency brake switch 21 is turned on, emergency brake signal S2 is entered control valve 23 for emergency brake. Thus, an emergency brake signal pressure is entered piston 8 through emergency brake signal oil passage 6, and the piston 8 is forcedly positioned at neutral position 8c. In other words, the piston 8 can be forcedly positioned at the neutral position 8c according to the emergency brake signal S2 regardless of the input of usual brake signal S1. Therefore, the displacement of the hydraulic pump 11 can be forcedly set to the neutral position (minimum displacement).

As a result, when it is desired to stop a vehicle urgently, the displacement of the hydraulic pump 11 can be returned to the neutral position with good responsivity, and the vehicle can be stopped urgently according to an operator's intention.

Besides, even when the hydraulic pump 11 of the direct control method is used, the displacement of the hydraulic pump 11 can be forcedly changed to a desired displacement according to an instruction from another channel different from an ordinary instruction, so that there is obtained an effect that the hydraulic pump 11 can be changed to a desired displacement quickly with good responsivity.

In order to achieve the second object, a second aspect of the invention is a brake control device for a hydraulic motor which is provided with a displacement control piston (8) for changing a volume of pressure oil discharged from a hydraulic pump (11), a hydraulic motor (12) which is driven by the pressure oil supplied from the hydraulic pump (11) and brake means (17, 18) which brake a shaft (12a) of the hydraulic motor (12), controls the volume of pressure oil discharged from the hydraulic pump (11) to control the drive of the hydraulic motor (12) and also to control the braking by the brake means (17, 18), wherein:

brake control means (32, 36) are disposed to control the displacement control piston (8) to discharge the pressure oil in a minimum volume from the hydraulic pump (11) by entering a brake instruction signal and also to control the brake means (17, 18) to the brake the shaft (12a) of the hydraulic motor (12) after the displacement of the hydraulic pump (11) becomes minimum.

The second aspect of the invention will be described specifically with reference to FIG. 4.

According to the second aspect of the invention, the piston 8 operates according to usual brake signal S1 to position at neutral position 8c, and the displacement of the hydraulic pump 11 becomes minimum. It is detected by neutral signal detection oil passage 32 that the displacement of the hydraulic pump 11 has became minimum, and a neutral signal (pressure zero) is entered the control valve 36. Thus, the control valve 36 is positioned at brake release position 36b. Therefore, the pressure oil is discharged from cylinder chamber 18a of the brake cylinder 18 to operate the brake member 17, and the shaft 12a of the hydraulic motor 12 is fixed by the brake member 17. Thus, the shaft 12a of the hydraulic motor 12 can be braked after the displacement of the hydraulic pump 11 has become minimum.

According to the second aspect of the invention, the mechanical brake can be operated after the hydraulic brake is operated without fail, so that durability of the hydraulic motor 12 can be improved and a heat load can be prevented from increasing. And, the capacity of the mechanical brake can be reduced.

To achieve the third object, a third aspect of the invention is a brake control device for a hydraulic motor which is provided with a displacement control piston (8) for changing a volume of pressure oil discharged from a hydraulic pump (11) according to a first instruction signal, a hydraulic motor (12) which is driven by the pressure oil supplied from the hydraulic pump (11) and brake means (17, 18) which brake a shaft (12a) of the hydraulic motor (12), which controls the volume of pressure oil discharged from the hydraulic pump (11) by entering the first instruction signal into the displacement control piston (8) to control the drive of the hydraulic motor (12) and also to control the braking by the brake means (17, 18), wherein:

brake control means (21, 23, 6, 32) are disposed to control the displacement control piston (8) so to discharge the pressure oil in a minimum amount from the hydraulic pump (11) regardless of the entry of the first instruction signal by entering a brake instruction signal different from the first instruction signal and also to control the brake means (17, 18) so to brake the shaft (12a) of the hydraulic motor (12) after the displacement of the hydraulic pump (11) becomes minimum.

The third aspect of the invention will be described specifically with reference to FIG. 2.

According to the third aspect of the invention, when the emergency brake switch 21 is turned on, emergency brake signal S2 is entered the emergency brake control valve 23. Thus, an emergency brake signal pressure is entered the piston 8 through the emergency brake signal oil passage 6, and the piston 8 is forcedly positioned at the neutral position 8c. In other words, the piston 8 can be forcedly positioned at the neutral position 8c according to the emergency brake signal S2 regardless of the entry of the usual brake signal S1. Therefore, the displacement of the hydraulic pump 11 can be forcedly set to the neutral position (minimum displacement). It is detected by the neutral signal detection oil passage 32 that the displacement of the hydraulic pump 11 has become minimum, and a neutral signal (pressure zero) is entered oil passage 33. Thus, when a predetermined time has passed after the neutral position was detected, the pressure oil is discharged from the cylinder chamber 18a of the brake cylinder 18 to operate the brake member 17, and the shaft 12a of the hydraulic motor 12 is fixed by the brake member 17. Thus, the shaft 12a of the hydraulic motor 12 can be braked after the displacement of the hydraulic pump 11 has become minimum.

According to the third aspect of the invention, the displacement of the hydraulic pump 11 is forcedly changed to the neutral position according to the emergency brake instruction, and the hydraulic brake can be effectively applied quickly with good responsivity. Besides, the mechanical brake is operated after the hydraulic brake has operated without fail, so that the capacity of the mechanical brake can be reduced.

DESCRIPTION OF THE PREFERRED EMBODIMENTS

Embodiments of the displacement control device for a hydraulic pump and the brake operating unit for a hydraulic motor to which the invention pertains will be described with reference to the accompanying drawings. It is assumed in the following descriptions that the invention is applied to a vehicle such as a bulldozer.

Figure 1:
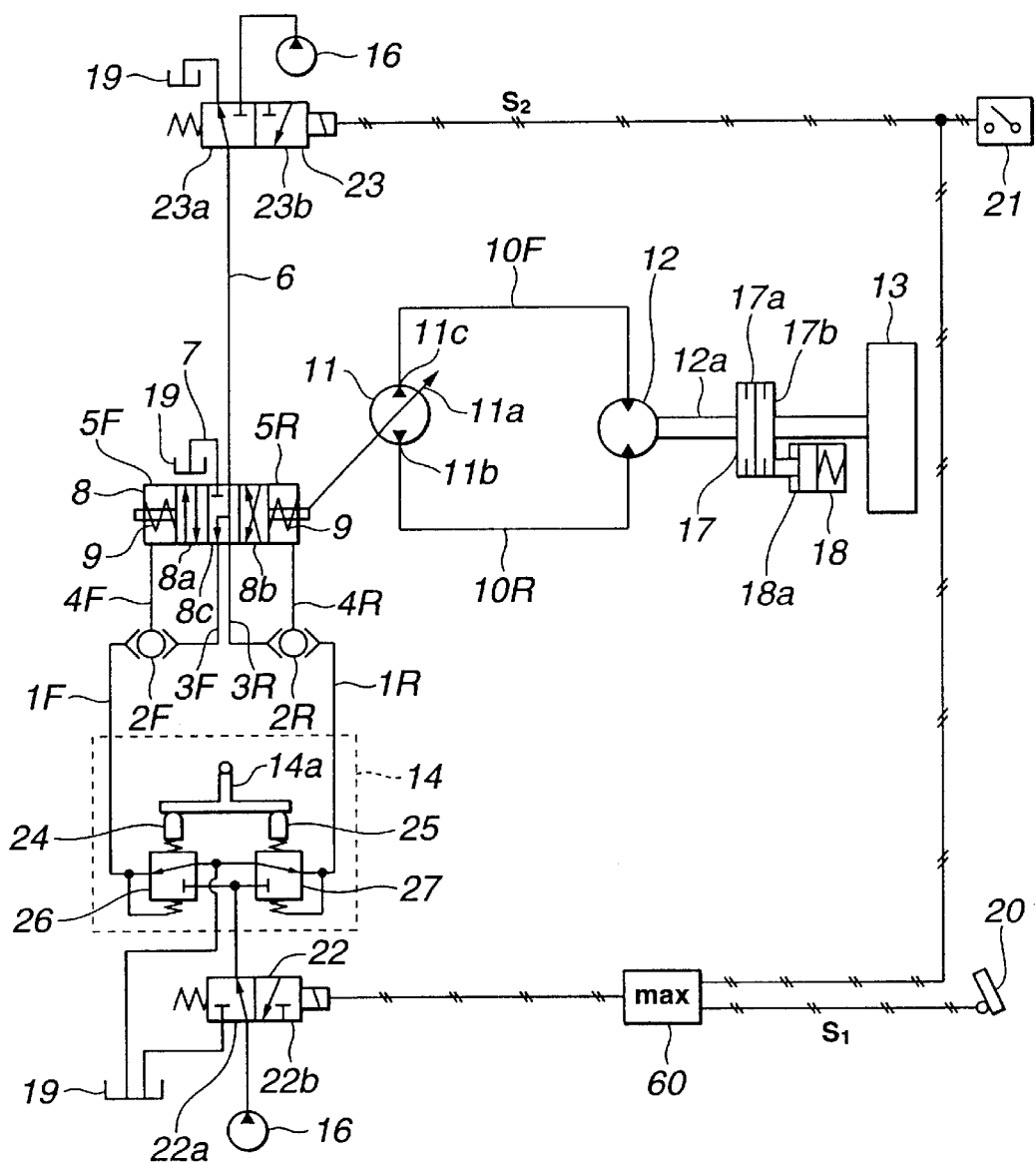
FIG. 1 is a hydraulic circuit diagram of a first embodiment.

FIG. 1 is a hydraulic circuit diagram of the first embodiment.

As shown in FIG. 1, a closed circuit is comprised of the hydraulic pump 11 and the hydraulic motor 12. It is assumed in this embodiment that the crawler belts (or wheels) 13 are rotated by the hydraulic motor 12 to run the vehicle.

The hydraulic pump 11 is a hydraulic pump of variable displacement type. The hydraulic pump 11 is a two-way flow type hydraulic pump which has two ports 11b, 11c and can reverse the flow of the pressure oil. For example, the hydraulic pump 11 is comprised of a swash plate type piston pump.

The hydraulic pump 11 is connected to an unshown motor (ex. engine). The motor rotates to rotate the hydraulic pump 11. A discharged flow rate of the hydraulic pump 11 is determined according to a rotating speed and a swash plate angle.

The displacement of the hydraulic pump 11 (swept volume) is changed according to a change in position of the swash plate 11a of the hydraulic pump 11.

The swash plate 11a of the hydraulic pump 11 is connected to the piston 8. The displacement of the hydraulic pump 11 is variable depending on the operation of the piston 8.

The hydraulic pump 11 is connected to respective ports of the hydraulic motor 12 through the oil passages 10F, 10R. The shaft 12a of the hydraulic motor 12 is connected to the crawler belt 13. Disk 17a is connected to the shaft 12a, and plate 17b is connected to the brake cylinder 18. The disk 17a and the plate 17b form the brake member 17. When the pressure oil is being supplied to cylinder chamber 18a of the brake cylinder 18, the disk 17a and the plate 17b are separated from each other, and the shaft 12a of the hydraulic motor 12 can be free to rotate. When the pressure oil is being discharged from the cylinder chamber 18a of the brake cylinder 18, the disk 17a and the plate 17b are in contact with each other, and the shaft 12a of the hydraulic motor 12 is fixed by the brake member 17. Namely, the mechanical brake is effective. The brake member 17 is disposed within the housing of the hydraulic motor 12.

Figure 17:
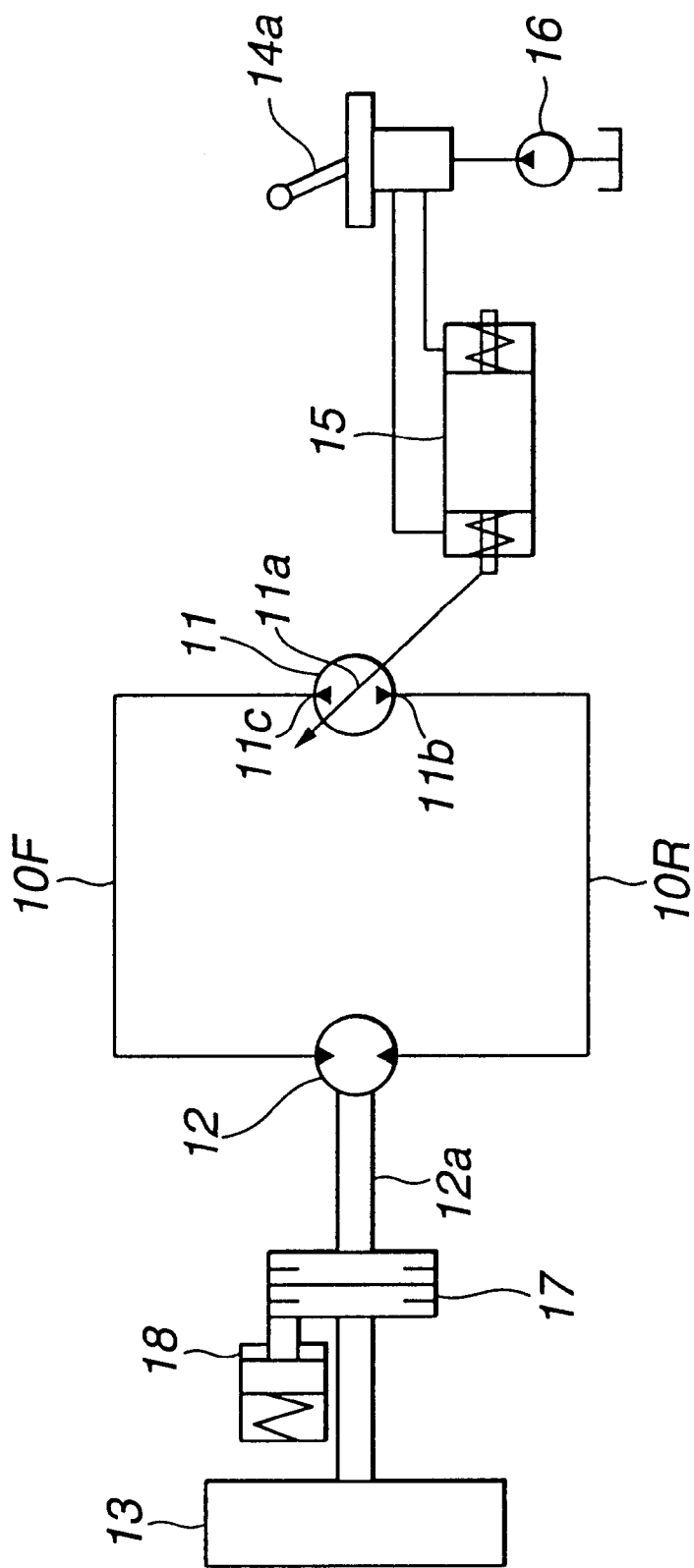
FIG. 17 is a diagram showing a prior art.

Operation lever device 14 is disposed to operate the piston 8. The operation lever device 14 is mainly comprised of pistons 24, 25 and reducing valves 26, 27 associated with the pistons 24, 25. The operation lever device 14 operates when operation lever 14a is operated in the same way as shown in FIG. 17.

Specifically, when the operation lever 14a is moved in a forward direction, the piston 24 moves downward, and when the operation lever 14a is moved in a backward direction, the piston 25 moves downward. When the pistons 24, 25 move downward, the reducing valves 26, 27 have an increased output pressure.

A pilot pressure oil is supplied to the reducing valves 26, 27 from the pilot pump 16 via usual brake control valve 22. The pressure oil supplied from the pilot pump 16 to the reducing valves 26, 27 is reduced by the reducing valves 26, 27 to a predetermined pressure according to control input of the operating lever 14a.

An outlet of the reducing valve 26 is communicated with one of inlets of shuttle valve 2F through oil passage 1F. And, an outlet of the reducing valve 27 is communicated with one of inlets of shuttle valve 2R through oil passage 1R.

The piston 8 has forward position 8a, reverse position 8b and neutral position 8c and is continuously movable among them. The piston 8 has forward side pressure receiving chamber 5F and reverse side pressure receiving chamber 5R which is opposite to it. Each of the pressure receiving chambers 5F, 5R is provided with spring 9. The piston 8 is connected to tank 19 through oil passage 7. The forward side pressure receiving chamber 5F is communicated with an outlet of the shuttle valve 2F through oil passage 4F. The reverse side pressure receiving chamber 5R is communicated with an outlet of the shuttle valve 2R through oil passage 4R. The other inlet of the shuttle valve 2F is connected to the piston 8 through oil passage 3F. And, the other inlet of the shuttle valve 2R is connected to the piston 8 through oil passage 3R.

Therefore, when the operation lever 14a is moved to the forward side, the pilot pressure oil having a pilot pressure according to the control input is supplied to the forward side pressure receiving chamber 5F of the piston 8 through the reducing valve 26, the oil passage 1F, the shuttle valve 2F and the oil passage 4F. Thus, the piston 8 moves from the neutral position 8c to the forward position 8a. In association with the movement of the piston 8 to the forward position 8a, the swash plate 11a of the hydraulic pump 11 is tilted to the forward side, and the pressure oil is discharged from the port 11c of the hydraulic pump 11. Similarly, when the operation lever 14a is moved to the reverse side, the pilot pressure oil having a pilot pressure according to the control input is supplied to the reverse side pressure receiving chamber 5R of the piston 8 through the reducing valve 27, the oil passage 1R, the shuttle valve 2R and the oil passage 4R. Thus, the piston 8 moves from the neutral position 8c to the reverse position 8b. In association with the movement of the piston 8 toward the reverse position 8c, the swash plate 11a of the hydraulic pump 11 is tilted to the reverse side, and the pressure oil is discharged from the port 11b of the hydraulic pump 11. Thus, the hydraulic pump 11 changes its displacement according to the control input of the operation lever 14a.

When the pressure oil which is discharged from the port 11c of the hydraulic pump 11 is supplied to the hydraulic motor 12 through the oil passage 10F, the hydraulic motor 12 operates, and the shaft 12a rotates in the forward direction. When the shaft 12a of the hydraulic motor 12 rotates in the forward direction, the crawler belt 13 is rotated in the forward direction to move the vehicle forward. Similarly, when the pressure oil which is discharged from the port 11b of the hydraulic pump 11 is supplied to the hydraulic motor 12 through the oil passage 10R, the hydraulic motor 12 operates, and the shaft 12a rotates in the reverse direction. When the shaft 12a of the hydraulic motor 12 rotates in the reverse direction, the crawler belt 13 is rotated in the reverse direction to move the vehicle backward.

The vehicle is provided with brake pedal 20 independent of the operation lever 14a. Service brake signal S1 having a magnitude corresponding to a depressed level of the brake pedal 20 is output as an electrical signal from the brake pedal 20. The service brake signal S1 may be an oil pressure signal.

The emergency brake switch 21 is provided independent of the brake pedal 20. Specifically, when the emergency brake switch 21 is turned on, the emergency brake signal S2 is output as an electrical signal. The emergency brake signal S2 may be an oil pressure signal. A signal level of the emergency brake signal S2 is equivalent to a signal level of the service brake signal S1 which is output when the brake pedal 20 is depressed to a maximum level.

The service brake signal S1 output from the brake pedal 20 and the signal output from the switch 21 are entered max circuit 60. In the max circuit 60, the signal levels of the two entered signals are compared, and the signal having a larger signal level is output. Therefore, when the emergency brake switch 21 is off, the service brake signal S1 is output from the max circuit 60. When the emergency brake switch 21 is on, the emergency brake signal S2 is output from the max circuit 60.

FIG. 1 shows that the emergency brake switch 21 is disposed independent of the brake pedal 20. But, the emergency brake switch 21 may be disposed at the maximum depressing position of the brake pedal 20. In other words, when the brake pedal 20 is depressed to the maximum depressing position, the emergency brake switch 21 is turned on, and the emergency brake signal S2 is output.

When the emergency brake switch 21 is off, the service brake signal S1 is entered the service brake control valve 22 through the max circuit 60.

The service brake control valve 22 has brake release position 22a and brake operation position 22b. The service brake control valve 22 is connected to the pilot pump 16 and the tank 19.

When the service brake signal S1 is not entered the service brake control valve 22, the service brake control valve 22 is positioned at the brake release position 22a. Therefore, the pilot pressure oil discharged from the pilot pump 16 is supplied to the reducing valves 26, 27 via the service brake control valve 22.

When the service brake signal S1 is entered the service brake control valve 22, the service brake control valve 22 is positioned at the brake operation position 22b. Therefore, the pilot pressure oil to be supplied to the reducing valves 26, 27 is cut off by the service brake control valve 22. The pressure supplied to the reducing valves 26, 27 drops to a pressure of the tank 19 via the service brake control valve 22. In this embodiment, an output pressure to the piston 8, which is determined according to the control input of the operation lever 14a and the depressed amount of the brake pedal 20 is determined as "first instruction signal".

When the emergency brake switch 21 is turned on, the emergency brake signal S2 is entered the emergency brake control valve 23. The emergency brake control valve 23 has brake release position 23a and brake operation position 23b. The emergency brake control valve 23 is connected to the piston 8 through the emergency brake signal oil passage 6. The emergency brake control valve 23 is connected to the pilot pump 16 and the tank 19.

When the emergency brake signal S2 is not entered the emergency brake control valve 23, the emergency brake control valve 23 is positioned in the brake release position 23a. Therefore, the pressure in the emergency brake signal oil passage 6 has a level of the pressure in the tank 19 through the emergency brake control valve 23. At this time, the emergency brake signal pressure is not being applied to the piston 8 through the emergency brake signal oil passage 6.

When the emergency brake signal S2 is entered the emergency brake control valve 23, the emergency brake control valve 23 is positioned in the brake operation position 23b. Therefore, the pilot pressure oil is supplied from the pilot pump 16 to the emergency brake signal oil passage 6 via the emergency brake control valve 23. At this time, the emergency brake signal pressure is applied to the piston 8 through the emergency brake signal oil passage 6. In this embodiment, the emergency brake signal S2 is determined as "second instruction signal".

An operation of the hydraulic circuit of FIG. 1 will be described below.

First, an operation to start the vehicle will be described.

The piston 8 is communicated with the tank 19 through the emergency brake signal oil passage 6 and the emergency brake control valve 23. The piston 8 is communicated with the tank 19 through the oil passage 7. Thus, one of the inlets of the shuttle valves 2F, 2R communicated with the oil passages 3F, 3R has a pressure equal to that of the tank 19 regardless of the position of the piston 8 by operating the operation lever 14a as described below.

When the operation lever 14a is operated to the forward side from the state described above, the pilot pressure oil having a pilot pressure according to the control input is supplied to the other inlet of the shuttle valve 2F through the reducing valve 26 and the oil passage 1F. Therefore, the pilot pressure oil is supplied to the forward side pressure receiving chamber 5F of the piston 8 through the outlet of the shuttle valve 2F and the oil passage 4F. Thus, the piston 8 is moved from the neutral position 8c to the forward position 8a. Specifically, the piston 8 is moved to a position where a pushing force by the pilot pressure in the right direction in the drawing, a returning force by the spring 9 in the left direction in the drawing and a force by the tilting moment in the left direction in the drawing are balanced. The pressure oil in the reverse side pressure receiving chamber 5R is discharged to the tank 19 through the oil passage 4R, the shuttle valve 2R and the oil passage 3R or discharged to the tank 19 through the oil passage 4R, the shuttle valve 2R and the oil passage 1R.

The swash plate 11a of the hydraulic pump 11 is tilted to the forward side as the piston 8 is moved toward the forward position 8a. Therefore, the pressure oil is taken from the oil passage 10R into the port 11b of the hydraulic pump 11 and discharged from the port 11c to the oil passage 10F. When the pressure oil discharged from the port 11c of the hydraulic pump 11 is supplied to the hydraulic motor 12 through the oil passage 10F, the hydraulic motor 12 operates and the shaft 12a rotates in the forward direction. When the shaft 12a of the hydraulic motor 12 rotates in the forward direction, the crawler belt 13 rotates in the forward direction to move the vehicle forward.

The oil passage 10F on the discharge side has a pressure higher than that of the oil passage 10R on the intake side. It is a case when the hydraulic pump 11 is pumping. The hydraulic pump 11 has a property that the swash plate 11a is returned toward the neutral position (minimum displacement) as the discharge pressure of the hydraulic passage 10F on the discharge side becomes higher. In other words, the tilting moment corresponding to the discharge pressure acts on the locker cam to work in a direction to return the swash plate 11a to the neutral position side. Therefore, the hydraulic pump 11 has a smaller displacement as the discharge pressure becomes higher.

The pump displacement can be decreased as the discharge pressure is increased when the vehicle is started to move. In other words, the pump pressure can be prevented from increasing sharply, and torque produced by the hydraulic motor 12 is limited. Therefore, a shock caused when the vehicle is started to move can be reduced.

When the operation lever 14a is operated to the backward side, the pilot pressure oil having a pilot pressure corresponding to the control input is similarly supplied to the other inlet of the shuttle valve 2R through the reducing valve 27 and the oil passage 1R. Therefore, the pilot pressure oil is supplied to the reverse side pressure receiving chamber 5R of the piston 8 through the outlet of the shuttle valve 2R and the oil passage 4R. Thus, the piston 8 is moved from the neutral position 8c to the reverse position 8b. Specifically, the piston 8 is moved to a position where a pushing force by the pilot pressure in the left direction in the drawing, a returning force by the spring 9 in the right direction in the drawing and a force by the tilting moment in the right direction in the drawing are balanced. The pressure oil in the forward side pressure receiving chamber 5F is discharged to the tank 19 through the oil passage 4F, the shuttle valve 2F and the oil passage 3F or discharged to the tank 19 through the oil passage 4F, the shuttle valve 2F and the oil passage 1F.

The swash plate 11a of the hydraulic pump 11 is tilted to the backward side as the piston 8 is moved to the reverse position 8b side. Therefore, the pressure oil is taken from the oil passage 10F into the port 11c of the hydraulic pump 11 and discharged from the port 11b into the oil passage 10R. When the pressure oil discharged from the port 11b of the hydraulic pump 11 is supplied to the hydraulic motor 12 through the oil passage 10R, the hydraulic motor 12 is operated to rotate the shaft 12a in the reverse direction. When the shaft 12a of the hydraulic motor 12 rotates in the reverse direction, the crawler belt 13 rotates in the reverse direction to move the vehicle backward.

An operation to stop the vehicle by depressing the brake pedal 20 when the vehicle is moving forward will be described.

When the brake pedal 20 is depressed, the service brake signal S1 entered the service brake control valve 22. The service brake control valve 22 is moved to the brake operation position 22b side. The pilot pressure oil to be supplied to the reducing valves 26, 27 is cut off by the service brake control valve 22. Original pressures of the reducing valves 26, 27 are gradually lowered to a level of the pressure of the tank 19 through the service brake control valve 22. Therefore, the pressure oil in the forward side pressure receiving chamber 5F is discharged to the tank 19 through the oil passage 4F, the shuttle valve 2F, the oil passage 1F or the oil passage 3F. The reverse side pressure receiving chamber 5R is communicated with the tank 19 through the oil passage 4R, the shuttle valve 2R, the oil passage 1R or the oil passage 3R. Therefore, the piston 8 is moved to a position where a return force to the neutral position 8c by the spring 9 in the left direction in the drawing and a force by the tilting moment in the right direction in the drawing are balanced. And, the piston 8 is returned to the neutral position 8c.

While the vehicle is braking, the oil passage 10R on the intake side has a pressure higher than in the oil passage 10F on the discharge side. It is when the hydraulic pump 11 is operating as a motor. The hydraulic pump 11 has a characteristic that the swash plate 11a is raised to the maximum displacement side as the pump pressure of the oil passage 10R on the intake side becomes higher. Specifically, the tilting moment corresponding to the pump pressure on the intake side acts on the locker cam to raise the swash plate 11a to the maximum displacement side, so that the tilting moment is increased as the pump pressure on the intake side becomes higher, and the displacement of the hydraulic pump 11 is increased. In other words, while the vehicle moving forward is braking, the tilting moment acts in the right direction in the drawing.

Thus, while the vehicle is braking and the pump pressure (brake pressure) on the intake side increases to have an increased braking torque, the pump displacement can be increased, so that the braking torque can be decreased. Thus, the brake torque is prevented from becoming excessive, and a shock while braking the vehicle can be reduced. An operation to stop the vehicle which is moving backward by depressing the brake pedal 20 is the same as above.

Then, an operation to make emergency stop of the vehicle by turning on the emergency brake switch 21 will be described.

When the emergency brake is operated, the signal S2 is also entered the max circuit 60, and the service brake control valve 22 is moved to the position 22b, so that one of the inlets of the shuttle valves 2F, 2R is communicated with the tank 19 through the oil passages 1F, 1R.

It is assumed that the emergency brake switch 21 is turned on when the piston 8 is in the forward position 8a.

When the emergency brake switch 21 is turned on, the emergency brake signal S2 is entered the emergency brake control valve 23.

When the emergency brake signal S2 is entered the emergency brake control valve 23, the emergency brake control valve 23 is positioned in the brake operation position 23b. Therefore, the pilot pressure oil is supplied from the pilot pump 16 to the emergency brake signal oil passage 6 through the emergency brake control valve 23. Thus, the emergency brake signal pressure is applied to the piston 8 through the emergency brake signal oil passage 6. The emergency brake signal pressure is entered the reverse side pressure receiving chamber 5R through the piston 8, the oil passage 3R, the shuttle valve 2R and the oil passage 4R to push back the piston 8 in the direction of the neutral position. At this time, a force by the emergency brake signal pressure in the left direction in the drawing, a return force to the neutral position 8c by the spring 9 in the left direction in the drawing and a force by the tilting moment in the right direction in the drawing act on the piston 8. When the emergency brake is operating, a force by the emergency brake signal pressure acts on the piston 8 in the left direction as compared with the moment when the service brake is operating. Therefore, when the emergency stop is made, a force to return the piston 8 to the neutral position 8c is large as compared with the service braking, and the piston 8 is returned to the neutral position 8c quickly with good responsivity.

Meanwhile, it is assumed that the emergency brake signal pressure is entered the piston 8 when the piston 8 is in the reverse position 8b.

The emergency brake signal pressure is entered the forward side pressure receiving chamber 5F through the piston 8, the oil passage 3F, the shuttle valve 2F and the oil passage 4F to push back the piston 8 in the direction of the neutral position.

When the piston 8 is returned to the neutral position 8c, the displacement of the hydraulic pump 11 becomes the neutral position (minimum displacement). The braking force acting on the hydraulic motor 12 becomes large and the vehicle is stopped urgently because the hydraulic pump 11 is in a state not to perform the discharge or intake of the pressure oil.

Thus, according to the first embodiment, the piston 8 is forcedly positioned in the neutral position 8c according to the emergency braking signal S2 regardless of the tilted amount of the operation lever 14a and the entry of the service brake signal S1, so that the displacement of the hydraulic pump 11 can be forced to be in the neutral position (minimum displacement). As a result, when it is desired to stop the vehicle urgently, the displacement of the hydraulic pump 11 can be returned to the neutral position with good responsivity, and the vehicle can be stopped urgently according to the operator's intention.

Specifically, even when the hydraulic pump 11 of the direct control method is used as the hydraulic pump, the displacement of the hydraulic pump 11 can be forcedly changed to a desired displacement by an instruction of a channel different from the usual instruction, so that there is obtained an effect that the hydraulic pump 11 can be changed quickly to a desired displacement with good responsivity.

The pilot pumps 16 in FIG. 1 are separately shown for convenience of illustration but may be a common pump as indicated by the same reference numeral.

Then, the second embodiment that the mechanical brake 17 can be applied after the piston 8 has returned to the neutral position 8c will be described.

Figure 2:
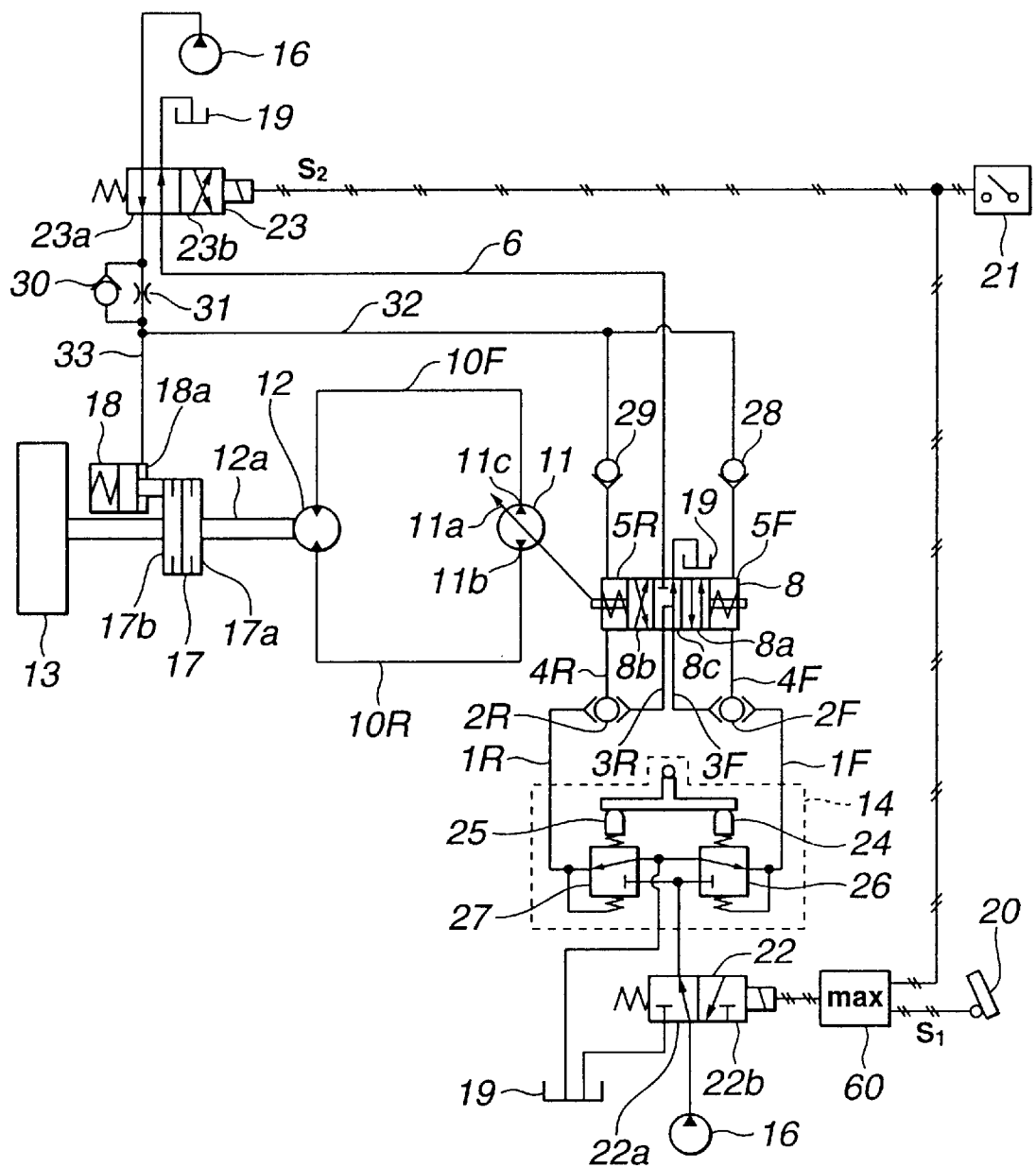
FIG. 2 is a hydraulic circuit diagram of a second embodiment.

FIG. 2 is a hydraulic circuit diagram of the second embodiment.

In FIG. 2, like reference numerals are used for like components as those of FIG. 1 and their descriptions will be omitted appropriately.

As shown in FIG. 2, the oil passage 33 is connected to the cylinder chamber 18a of the brake cylinder 18. The oil passage 33 is connected to the emergency brake control valve 23 through orifice 31 and the check valve 30. The emergency brake control valve 23 is an electromagnetic switching valve which operates upon receiving an electric signal. The service brake control valve 20 is also an electromagnetic proportional control valve which operates upon receiving an electric signal.

The emergency brake control valve 23 is connected to the pilot pump 16 and the tank 19. The check valve 30 and orifice 31 are disposed in parallel to each other. The check valve 30 allows the pressure oil flow in a direction from the emergency brake control valve 23 side to the brake cylinder 18 side.

The forward side pressure receiving chamber 5F of the piston 8 is communicated with the neutral signal detection oil passage 32 via the check valve 28. And, the reverse side pressure receiving chamber 5R of the piston 8 is communicated with the neutral signal detection oil passage 32 via the check valve 29. The check valves 28, 29 allow the pressure oil to pass only in a direction from the pressure receiving chambers 5F, 5R of the piston 8 toward the neutral signal detection oil passage 32 side. The neutral signal detection oil passage 32 is connected to the oil passage 33.

When the emergency brake signal S2 is not entered the emergency brake control valve 23, the emergency brake control valve 23 is positioned in the brake release position 23a. Therefore, the pressure within the emergency brake signal oil passage 6 becomes to have a level of the pressure within the tank 19 through the emergency brake control valve 23. At this time, the emergency brake signal pressure is not supplied to the piston 8 through the emergency brake signal oil passage 6. And, the discharge port of the pilot pump 16 is communicated with the cylinder chamber 18a of the brake cylinder 18 through the emergency brake control valve 23, the check valve 30 and the oil passage 33.

When the emergency brake signal S2 is entered the emergency brake control valve 23, the emergency brake control valve 23 is positioned in the brake operation position 23b. Therefore, the pilot pressure oil is supplied from the pilot pump 16 to the emergency brake signal oil passage 6 via the emergency brake control valve 23. At this time, the emergency brake signal pressure is applied to the piston 8 through the emergency brake signal oil passage 6. And, the tank 19 is communicated with the cylinder chamber 18a of the brake cylinder 18 through the emergency brake control valve 23, throttle 31, and the oil passage 33.

Then, an operation of the hydraulic circuit of FIG. 2 will be described.

An operation when the vehicle starts to move and an operation when the vehicle makes an ordinary stop are the same as in the first embodiment shown in FIG. 1, so that their descriptions will be omitted, and an operation at the emergency stop will be described below.

Operations when the emergency brake switch 21 is turned on to make an emergency stop of the vehicle will be described.

When the emergency brake signal S2 is not entered the emergency brake control valve 23, the pilot pressure oil discharged from the pilot pump 16 is supplied to the cylinder chamber 18a of the brake cylinder 18 through the emergency brake control valve 23, the check valve 30 and the oil passage 33. When the pilot pressure oil is supplied to the cylinder chamber 18a of the brake cylinder 18, the disk 17a and the plate 17b of the brake member 17 are separated from each other, and the shaft 12a of the hydraulic motor 12 can rotate freely. In other words, the mechanical brake is not effective.

It is assumed that the piston 8 is in the forward position 8a, and the emergency brake switch 21 is turned on.

When the emergency brake switch 21 is turned on, the emergency brake signal S2 is entered the emergency brake control valve 23.

When the emergency brake signal S2 is entered the emergency brake control valve 23, the emergency brake control valve 23 is positioned in the brake operation position 23b. Therefore, the pilot pressure oil is supplied from the pilot pump 16 to the emergency brake signal oil passage 6 through the emergency brake control valve 23. Thus, the emergency brake signal pressure is applied to the piston 8 through the emergency brake signal oil passage 6. The emergency brake signal pressure is entered the reverse side pressure receiving chamber 5R through the piston 8, the oil passage 3R, the shuttle valve 2R and the oil passage 4R to push back the piston 8 in the neutral position direction. Therefore, at the emergency stop, a force to return the piston 8 to the neutral position 8c becomes large as compared with the service stop, and the piston 8 returns to the neutral position quickly with good responsivity.

Meanwhile, when the emergency brake signal S2 is entered the emergency brake control valve 23, the pressure oil in the cylinder chamber 18a of the brake cylinder 18 is discharged to the tank 19 through the oil passage 33, the throttle 31 and the emergency brake control valve 23. When the pressure oil is discharged from the cylinder chamber 18a of the brake cylinder 18, the disk 17a and the plate 17b are mutually contacted, and the shaft 12a of the hydraulic motor 12 is fixed by the brake member 17. Namely, the mechanical brake becomes effective.

Then, a relation between the time until the piston 8 is positioned in the neutral position 8c, namely the time after the emergency hydraulic brake becomes effective and the vehicle speed lowers to zero and the time until the pressure oil in the cylinder chamber 18a of the brake cylinder 18 is thoroughly discharged, namely the time until the mechanical brake becomes effective will be described.

Along with the entry of the emergency brake signal S2, it is started to discharge the pressure oil in the cylinder chamber 18a of the brake cylinder 18 to the tank 19 through the oil passage 33 and the throttle 31, so that the pressure in the oil passage 33 is lowered.

At this time, when the piston 8 is positioned somewhere other than the neutral position 8c, the emergency brake signal pressure oil is being applied to the forward side pressure receiving chamber 5F or the reverse side pressure receiving chamber 5R through the emergency brake signal oil passage 6, the piston 8, the oil passage 3F or 3R, the shuttle valve 2F or 2R and the oil passage 4F or 4R. Therefore, the pressure oil is continuously supplied to the oil passage 33 from the check valve 28 or 29 through the neutral signal detection oil passage 32. Thus, a pressure drop in the oil passage 33 is suppressed when the braking cylinder 18 discharges the pressure oil. In other words, when the piston 8 is positioned somewhere other than the neutral position 8c, the mechanical brake does not operate.

When the piston 8 is positioned in the neutral position 8c, the emergency brake signal pressure is cut off by the piston 8. And, the forward side pressure receiving chamber 5F and the reverse side pressure receiving chamber 5R have a pressure at a level of the pressure in the tank 19. Therefore, the pressure oil is not supplied from the check valves 28, 29 to the oil passage 33 through the neutral signal detection oil passage 32.

Subsequently, the pressure oil in the cylinder chamber 18a of the brake cylinder 18 is gradually discharged to the tank 19 through the oil passage 33 and the throttle 31, and the disk 17a and the plate 17b come into contact with each other as a result. The throttle 31 is determined to have a size so that the pressure oil in the cylinder chamber 18a is thoroughly discharged from the cylinder chamber 18a in a predetermined period of time from the time when the supply of the pressure oil to the oil passage 33 through the neutral position detection oil passage 32 is stopped. Therefore, after a lapse of predetermined time after the piston 8 is positioned in the neutral position 8c and the vehicle has substantially stopped, the pressure oil in the cylinder chamber 18a of the braking cylinder 18 is thoroughly discharged, and the mechanical brake becomes effective.

Figure 18:
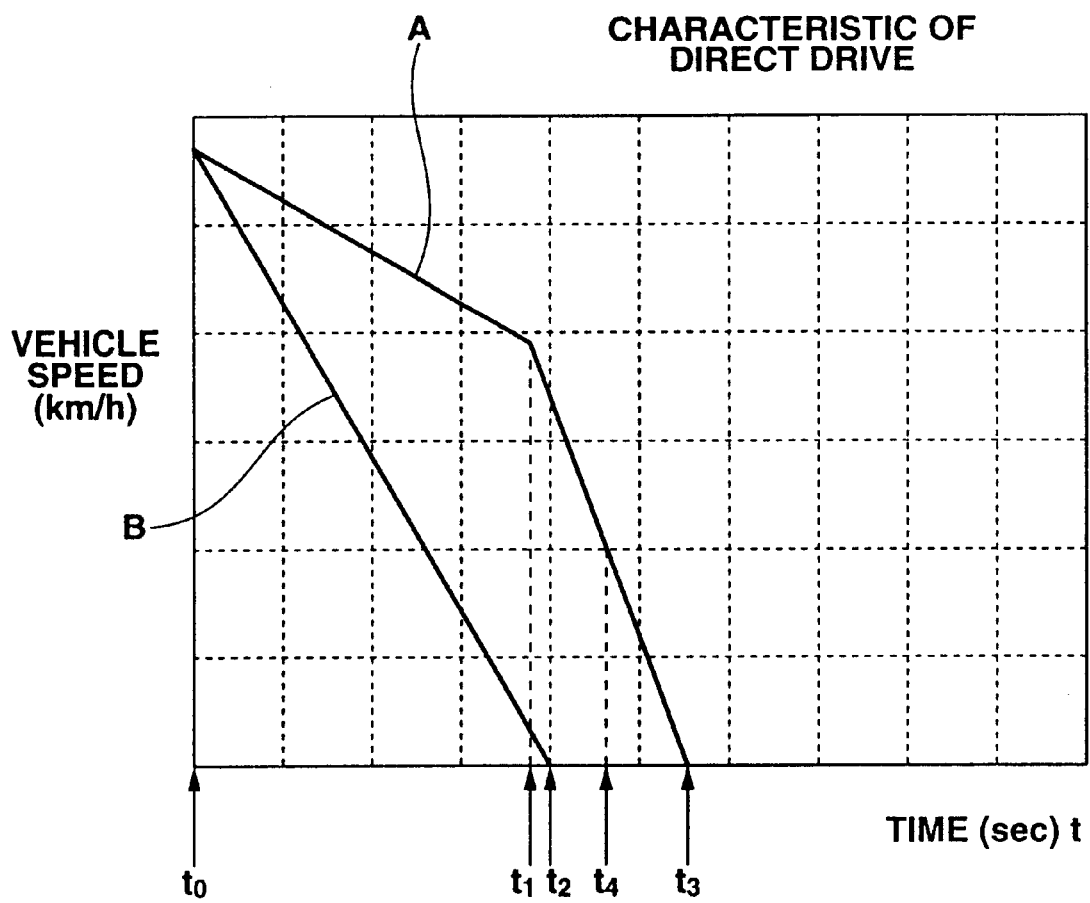
FIG. 18 is a diagram showing a relation between time and vehicle speed.

Then, effects of the second embodiment will be described with reference to FIG. 18. FIG. 18 shows brake characteristics. The horizontal axis indicates elapsed time t after a brake instruction is given. The vertical axis indicates a vehicle speed. In FIG. 18, B indicates a characteristic involved in braking by the hydraulic circuit of this embodiment.

As indicated by the characteristic B, when the emergency brake signal S2 is instructed at time t0, an emergency hydraulic brake becomes effective and make the vehicle speed zero, and the vehicle stops at time t2. Specifically, according to this embodiment, the displacement of the hydraulic pump 11 is forcedly changed to the neutral position by the emergency brake signal S2 of a channel different from the service brake signal S1, so that the hydraulic brake becomes effective quickly with good responsivity as compared with the existing characteristic A.

The mechanical brake operates at time t4 after a lapse of predetermined time from the time t2 when the emergency hydraulic brake becomes effective and the vehicle speed becomes zero, and the shaft 12a of the hydraulic motor 12 is fixed. In other words, the mechanical brake can be operated after the emergency hydraulic brake has operated without fail in this embodiment.

Therefore, because the mechanical brake is not operated when the shaft 12a of the hydraulic motor 12 is rotating at a high speed as indicated by the existing characteristic A, abrasion debris resulting from friction does not scatter in the motor housing. Therefore, durability of the hydraulic motor 12 can be improved without adversely affecting on parts such as the sealing material within the motor housing. The problem that the thermal load increases does not occur because the shaft 12a of the hydraulic motor 12 rotating at a high speed is not forcedly fixed by the brake member 17. Besides, a large-capacity mechanical brake is not needed because the shaft 12a of the hydraulic motor 12 rotating at a high speed is not stopped. Therefore, the mechanical brake, namely the brake member 17, the brake cylinder 18 and the like, can be made compact.

In the hydraulic circuit of FIG. 2, brake torque can be made excessive because the emergency brake is used other than the hydraulic brake. In other words, the brake torque is increased by braking to overcome a situation that the pump displacement become large due to the tilting moment, so that the hydraulic pump 11 can be made to have a small displacement.

Therefore, in an extreme case, the hydraulic pump 11 cuts off the pressure oil discharged from the hydraulic motor 12. Accordingly, the circuit shown in FIG. 2 is generally provided with a safety valve and an intake valve. When the pressure of the oil passage 10R reaches a predetermined pressure (e.g., 40 MPa) of the safety valve, the pressure oil discharged from the hydraulic motor 12 flows through the safety valve and also the intake valve and enters the oil passage 10F. After entering the oil passage 10F, the pressure oil is taken in by the hydraulic motor and discharged to the oil passage 10R.

Thus, if the brakes are applied exceeding the predetermined pressure of the safety valve as described above, the neutral of the piston 8 becomes irrelevant to the stop of the vehicle. In other words, a system of applying the mechanical brake upon detecting that the piston 8 is neutral is not formed.

To prevent from falling in such a situation, the movement of the piston 8 at the emergency braking may be delayed slightly by disposing for example an orifice on the oil passages 3F, 3R of FIG. 2.

On an actual vehicle, the movement of the piston is delayed by circuit resistance in the hose of the emergency brake signal oil passage 6, the emergency brake control valve 23 and the like. Therefore, the pressure does not increase to a level exceeding the set pressure of the safety valve. Even in such a state, an enough braking is obtained to make the emergency stop of the vehicle, and there is no problem in practical use.

Therefore, "the piston 8 of the hydraulic pump 11 has become neutral" is used in the same meaning as "the vehicle has substantially stopped" in this specification.

The hydraulic circuit of FIG. 2 may be modified as required.

Third to fourteenth embodiments will be described. Like reference numerals are used for like components of FIG. 2, and their descriptions will be omitted if not necessary below.

The third embodiment which is a modification in part of the second embodiment will be described.

Figure 3:
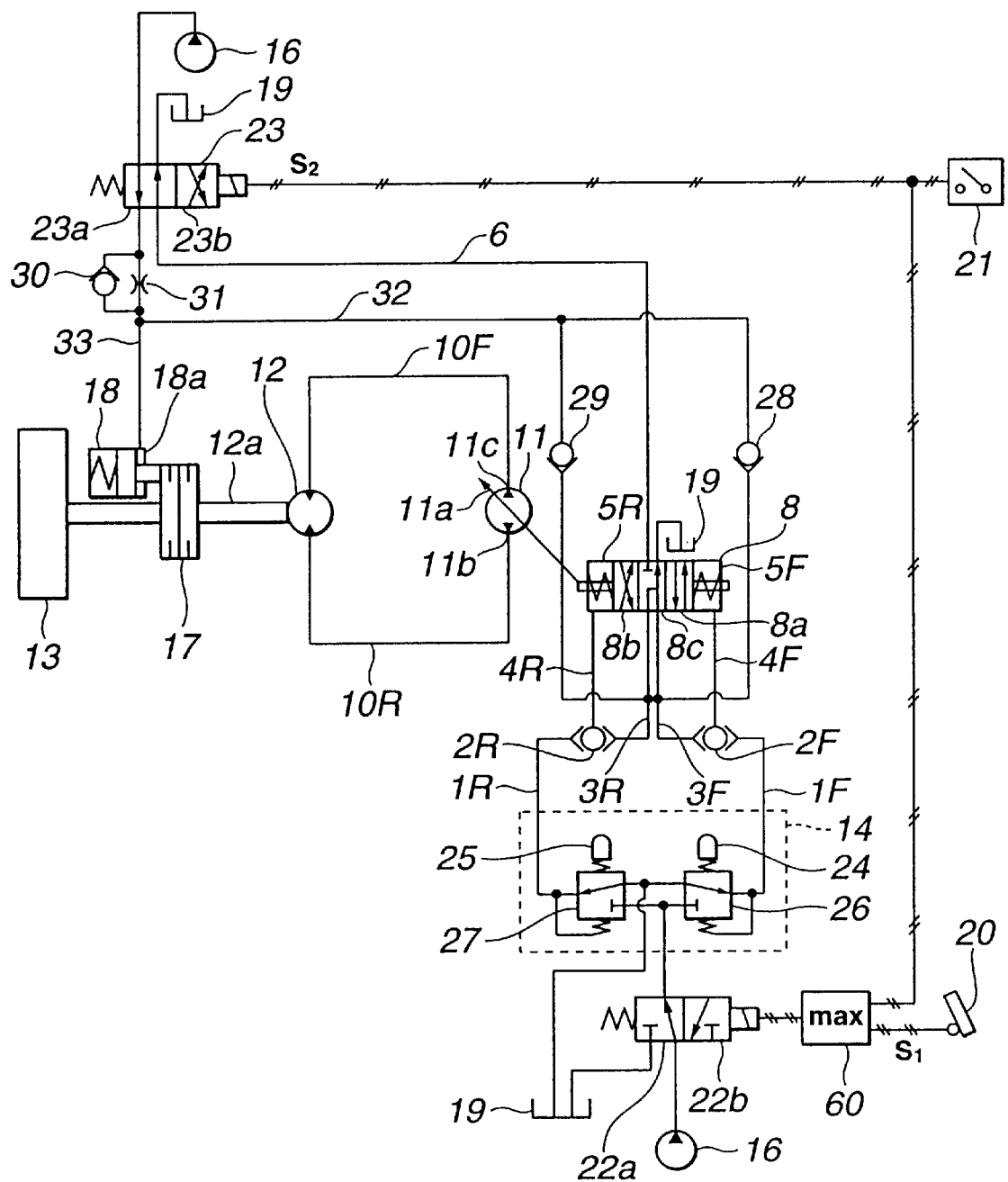
FIG. 3 is a hydraulic circuit diagram of a third embodiment.

FIG. 3 is a hydraulic circuit diagram of the third embodiment.

In this embodiment, the oil passage 3F is communicated with the neutral signal detection oil passage 32 via the check valve 28. And the oil passage 3R is communicated with the neutral signal detection oil passage 32 via the check valve 29. The check valves 28, 29 allow the pressure oil to flow from the oil passages 3F, 3R in a direction toward the neutral signal detection oil passage 32. The neutral signal detection oil passage 32 is connected to the oil passage 33.

Therefore, the hydraulic circuit of FIG. 3 operates in the same way as the hydraulic circuit of the embodiment shown in FIG. 2.

Specifically, when the piston 8 is positioned somewhere other than the neutral position 8c, the emergency brake signal pressure oil is applied to the oil passage 3F or 3R through the emergency brake signal oil passage 6 and the piston 8. Therefore, the pressure oil is continuously supplied from the oil passage 3F or 3R to the oil passage 33 through the check valves 28 or 39 and the neutral signal detection oil passage 32. Thus, the mechanical brake does not operate.

When the piston 8 is positioned in the neutral position 8c, the emergency brake signal pressure oil is cut off by the piston 8. And the pressures of the oil passages 3F and 3R become the same level as that in the tank 19. Thus, the supply of the pressure oil from the check valves 28, 29 to the oil passage 33 through the neutral signal detection oil passage 32 is stopped.

Then, the pressure oil in the cylinder chamber 18a of the brake cylinder 18 is gradually discharged to the tank 19 through the oil passage 33 and the orifice 31.

In the above embodiment, when the emergency brake signal S2 is instructed, the piston 8 is forcedly moved in the direction of the neutral position 8c so to apply the emergency hydraulic brake.

Then, the fourth embodiment with the emergency hydraulic brake omitted will be described.

Figure 4:
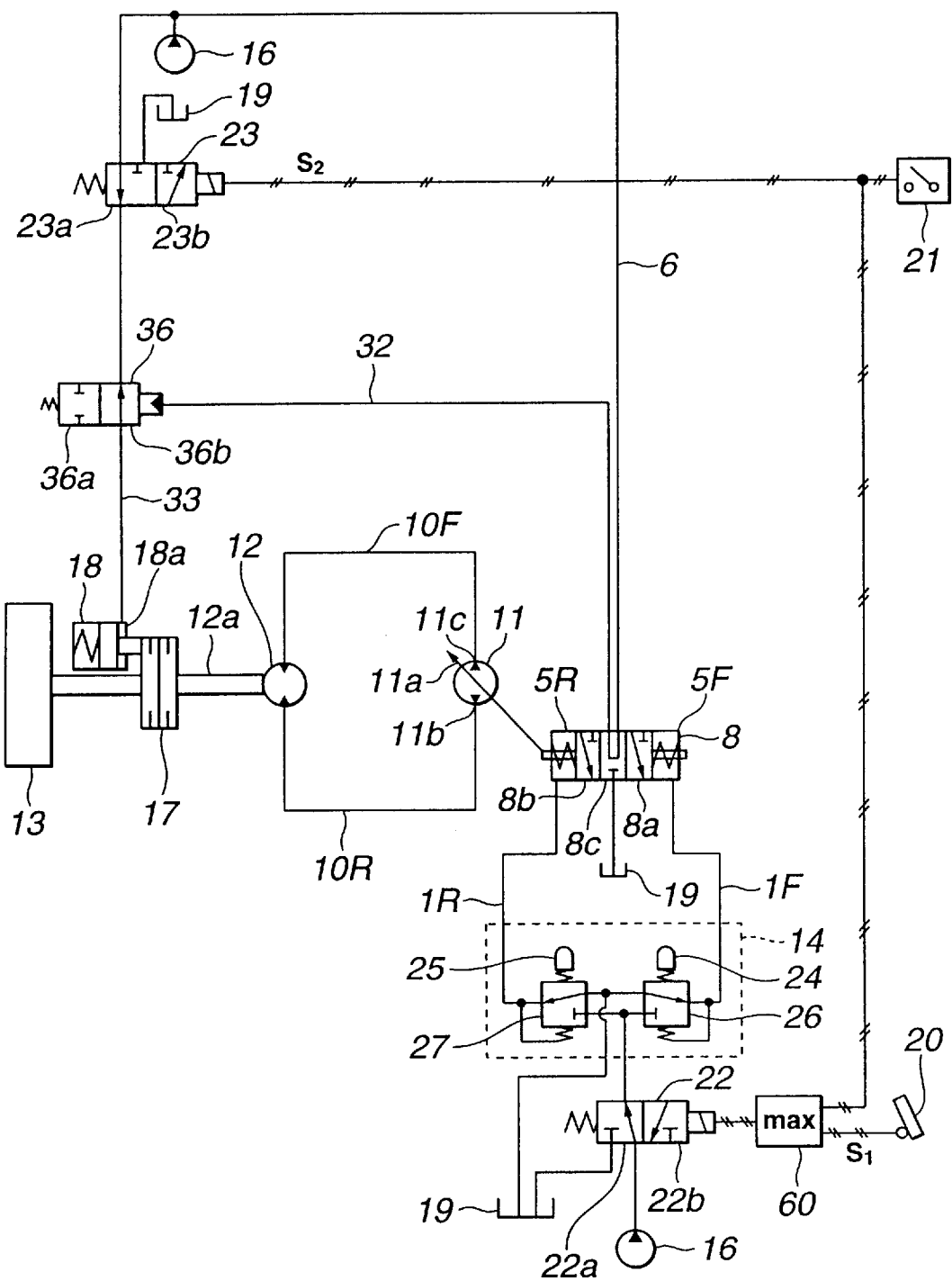
FIG. 4 is a hydraulic circuit diagram of a fourth embodiment.

FIG. 4 shows a hydraulic circuit diagram of the fourth embodiment. In the fourth embodiment, when service brake signal S1 is instructed, the piston 8 is moved in a direction of the neutral position 8c to position the piston 8 in the neutral position 8c, and the mechanical brake is applied.

The oil passage 6 and the neutral signal detection oil passage 32 are connected to the piston 8 of this embodiment. When the piston 8 is positioned in the neutral position 8c, the oil passage 6 is communicated with the neutral signal detection oil passage 32. When the piston 8 is positioned in the forward position 8a or the reverse position 8b, the oil passage 6 and the neutral signal detection oil passage 32 are cut off, and the neutral signal detection oil passage 32 is communicated with the tank 19.

The control valve 36 is disposed instead of the throttle 31 of FIG. 2 and FIG. 3. The control valve 36 is a valve for controlling the pressure oil discharged from the cylinder chamber 18a of the brake cylinder 18. The control valve 36 has cut-off position 36a and discharge position 36b. The pilot port of the control valve 36 is communicated with the neutral signal detection oil passage 32.

Therefore, the hydraulic circuit of FIG. 4 operates as follows.

Specifically, when the piston 8 is positioned somewhere other than the neutral position 8c, the discharge pressure of the pilot pump 16 passes through the oil passage 6 but interrupted by the piston 8, so that the discharge pressure of the pilot pump 16 is not applied to the neutral signal detection oil passage 32. Therefore, the neutral signal detection oil passage 32 is communicated with the tank 19 via the piston 8. Therefore, the control valve 36 is positioned in the cut-off position 36a. When the control valve 36 is positioned in the cut-off position 36a, the pressure oil in the cylinder chamber 18a of the brake cylinder 18 is not discharged to the tank 19 because it is cut off by the control valve 36. Therefore, a state that the mechanical brake is released is maintained.

When the piston 8 is positioned in the neutral position 8c, the discharge pressure of the pilot pump 16 is applied to the neutral signal detection oil passage 32 through the oil passage 6 and the piston 8. Therefore, the pilot pressure is applied to the pilot port of the control valve 36 through the neutral signal detection oil passage 32. Thus, the control valve 36 is positioned at the discharge position 36b. When the control valve 36 is positioned in the discharge position 36b, the pressure oil in the cylinder chamber 18a of the brake cylinder 18 is discharged to the tank 19 through the oil passage 33, the control valve 36 and the mechanical brake control valve 23. Therefore, the hydraulic brake operates to position the piston in the neutral position 8c, and then the mechanical brake operates.

According to the fourth embodiment, the mechanical brake can be operated after the swash plate 11a of the hydraulic pump 11 has thoroughly come to the neutral position, namely the hydraulic brake has operated without fail, so that the shaft 12a of the hydraulic motor 12 rotating at a high speed is not fixed by the brake member 17. Thus, the durability of the hydraulic motor 12 can be improved to prevent a thermal load from increasing, and the capacity of the mechanical brake such as the brake member 17, the brake cylinder 18 and the like can be reduced.

The fifth embodiment that the swash plate 11a of the hydraulic pump 11 can be forcedly positioned somewhere other than the neutral position (minimum displacement) will be described.

Figure 5:
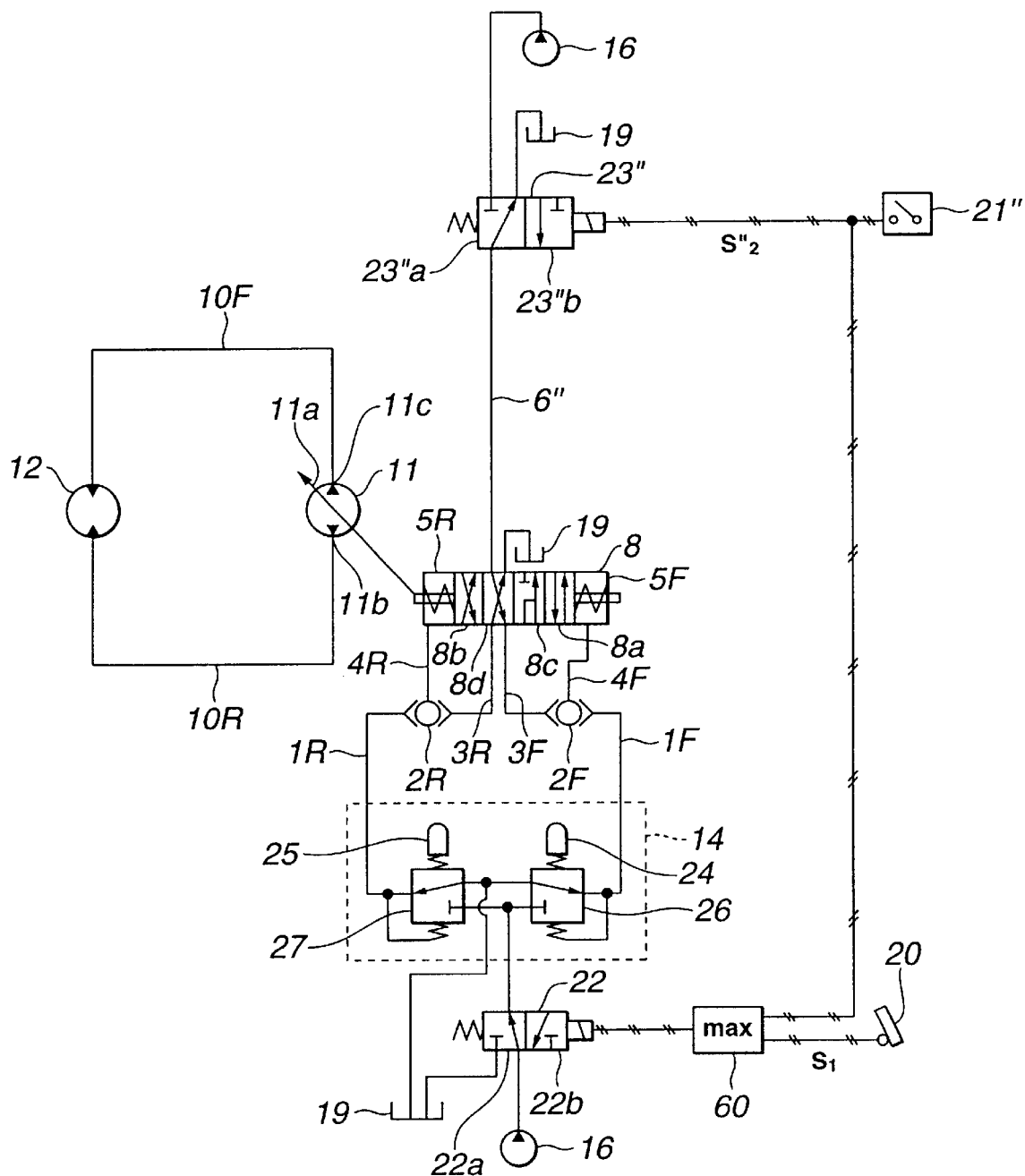
FIG. 5 is a hydraulic circuit diagram of a fifth embodiment.

FIG. 5 shows a hydraulic circuit diagram of the fifth embodiment.

The piston 8 of this embodiment has the forward position 8a, the piston neutral position 8c, the reverse position 8b and the pump neutral position 8d. Specifically, the neutral position 8c of the piston 8 is different from the neutral position 8c of FIG. 1 to FIG. 4 and is offset to the forward position side. In the first to fourth embodiments, the positions 8b, 8d of the piston 8 are the same but they are different in the fifth embodiment. Therefore, when the piston 8 is positioned at the neutral position, the swash plate 11a of the hydraulic pump 11 is operated to move forward from the neutral position (minimum displacement) by a predetermined displacement.

Switch 21", external signal control valve 23" and external signal oil passage 6 are disposed instead of the emergency brake switch 21, the emergency brake control valve 23 and the emergency brake signal oil passage 6, respectively. The external signal oil passage 6" is connected to the piston 8. Namely, the switch 21" is disposed independent of the brake pedal 20. When the switch 21" is turned on, external signal S"2 is output as an electrical signal. The external signal S"2 may be an oil pressure signal. A signal level of the external signal S"2 is equivalent to a signal level of the service brake signal S1 which is output when the brake pedal 20 is depressed to the maximum depression level.

The service brake signal S1 output from the brake pedal 20 and the signal output from the switch 21" are entered the max circuit 60. The max circuit 60 compares the two entered signals for their signal levels and outputs the signal having a larger signal level. Thus, when the switch 21" is off, the service brake signal S1 is output from the max circuit 60. And, when the switch 21" is on, the external signal S"2 is output from the max circuit 60.

When the switch 21" is turned on, the external signal S"2 is entered the external signal control valve 23" to position it in the valve position 23"b. Therefore, the external signal pressure is applied from the pilot pump 16 to the piston 8 through the external signal control valve 23" and the external signal oil passage 6". At the same time, the external signal S"2 is entered the service brake control valve 22, and the service brake control valve 22 is positioned in the valve position 22b.

Therefore, the hydraulic circuit of FIG. 5 operates as follows.

Specifically, it is assumed that the switch 21" is turned on when the piston 8 is moving to the reverse position 8b or the pump neutral position 8d.

When the switch 21" is turned on, the external signal S"2 is entered the external signal control valve 23". At the same time, the external signal S"2 is entered the service brake control valve 22.

Therefore, the service brake control valve 22 is positioned in the valve position 22b, and the external signal control valve 23" is positioned in valve position 23"b. Thus, the pilot pressure oil is supplied from the pilot pump 16 to the external signal oil passage 6" through the external signal control valve 23". The external signal pressure is applied to the piston 8 through the external signal oil passage 6". The external signal pressure is entered the forward side pressure receiving chamber 5F through the piston 8, the oil passage 3F, the shuttle valve 2F and the oil passage 4F to push back the piston 8 toward the neutral position. Accordingly, when entering the external signal, the force to return the piston 8 to the piston neutral position 8c becomes high as compared with the normal control, and the piston 8 is returned to the piston neutral position 8c quickly with good responsivity.

When the piston 8 is positioned in the piston neutral position 8c, the swash plate 11a of the hydraulic pump 11 is tilted from the neutral position (minimum displacement) toward the forward side by a predetermined displacement. In other words, according to this embodiment, when the external signal S"2 is instructed, the swash plate 11a of the hydraulic pump 11 can be forcedly positioned somewhere other than the neutral position (minimum displacement).

Then, the sixth embodiment using one-way flow type hydraulic pump 11' instead of the two-way flow type hydraulic pump 11 will be described.

Figure 6:
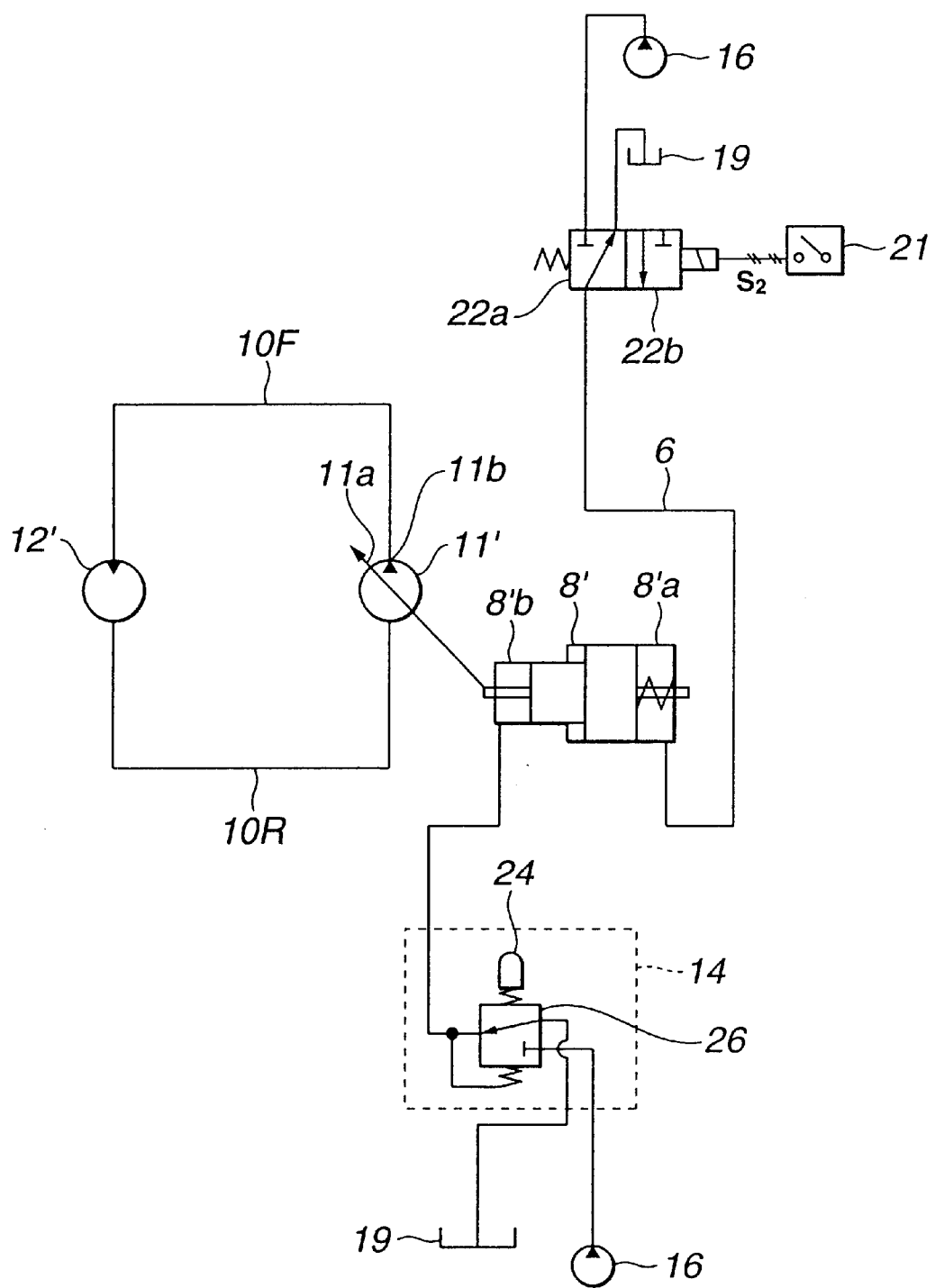
FIG. 6 is a hydraulic circuit diagram of a sixth embodiment.

FIG. 6 shows a hydraulic circuit diagram of the sixth embodiment.

In this embodiment, the one-way flow type hydraulic pump 11' which can flow the pressure oil from the oil passage 10R to the oil passage 10F only is used instead of the two-way flow type hydraulic pump 11. The hydraulic pump 11' takes in the pressure oil from the oil passage 10R and discharges it from intake port 11'b to the oil passage 10F. Swash plate 11'a of the hydraulic pump 11' is moved to change the displacement (swept volume) of the hydraulic pump 11'.

Hydraulic motor 12' which can rotate in one direction only is used instead of the hydraulic motor 12. The hydraulic motor 12' rotates to take in the pressure oil from the oil passage 10F and discharges it to the oil passage 10R.

And, piston 8' corresponding to the one-way flow type hydraulic pump 11' is used instead of the piston 8 corresponding to the two-way flow type hydraulic pump 11. The piston 8' has large-diameter side pressure receiving chamber 8'a and small-diameter side pressure receiving chamber 8'b.

The operation lever device 14 is comprised of the piston 24 and the reducing valve 26 corresponding to the piston 24. The reducing valve 26 has its outlet communicated with the small-diameter side pressure receiving chamber 8'b of the piston 8' through the oil passage 1F. The pilot pressure oil discharged from the pilot pump 16 as the piston 24 is replaced is reduced its pressure by the reducing valve 26 and supplied to the small-diameter side pressure receiving chamber 8'b of the piston 8' through the oil passage 1F.

The emergency brake signal oil passage 6 is communicated with the large-diameter side pressure receiving chamber 8'a of the piston 8'. The pressure oil of the small-diameter side pressure receiving chamber 8'b of the piston 8' acts in a direction that the displacement of the hydraulic pump 11' becomes large, and the pressure oil of the large-diameter side pressure receiving chamber 8'a of the piston 8' acts in a direction that the displacement of the hydraulic pump 11' becomes small.

Therefore, the hydraulic circuit of FIG. 6 operates as follows.

Specifically, it is assumed that the emergency brake switch 21 is turned on when the swash plate 11'a of the hydraulic pump 11' is tiling to the maximum displacement side. When the emergency brake switch 21 is turned on, the emergency brake control valve 23 is switched to the brake operation position 23b, and the emergency brake signal pressure is applied from the pilot pump 16 to the large-diameter side pressure receiving chamber 8'a of the piston 8' through the emergency brake signal oil passage 6.

Here, the maximum pressure of the pilot pressure oil supplied to the small-diameter side pressure receiving chamber 8'b of the piston 8' is a discharge pressure of the pilot pump 16. Meanwhile, the emergency brake signal pressure supplied to the large-diameter side pressure receiving chamber 8'a of the piston 8' is a discharge pressure of the pilot pump 16. Namely, the maximum value of the pressure supplied to the small-diameter side pressure receiving chamber 8'b of the piston 8' becomes equal to that supplied to the large-diameter side pressure receiving chamber 8'a. A diameter of the piston 8' on the side of the large-diameter side pressure receiving chamber 8'a is larger than that on the side of the small-diameter side pressure receiving chamber 8'b. Therefore, the force of the piston 8' acting on the large-diameter side pressure receiving chamber 8'a is larger than that on the small-diameter side pressure receiving chamber 8'b. The piston 8' is positioned to the minimum displacement by tilting the swash plate 11'a of the hydraulic pump 11' to the minimum displacement side quickly with good responsivity.

As described above, when the emergency brake signal S2 is instructed, the swash plate 11'a of the one-way flow type hydraulic pump 11' can be forcedly positioned in the minimum displacement position according to this embodiment.

Then, the seventh embodiment which can forcedly position the swash plate 11a of the two-way flow type hydraulic pump 11 not to the neutral position (minimum displacement) but to the maximum displacement position will be described.

Figure 7:
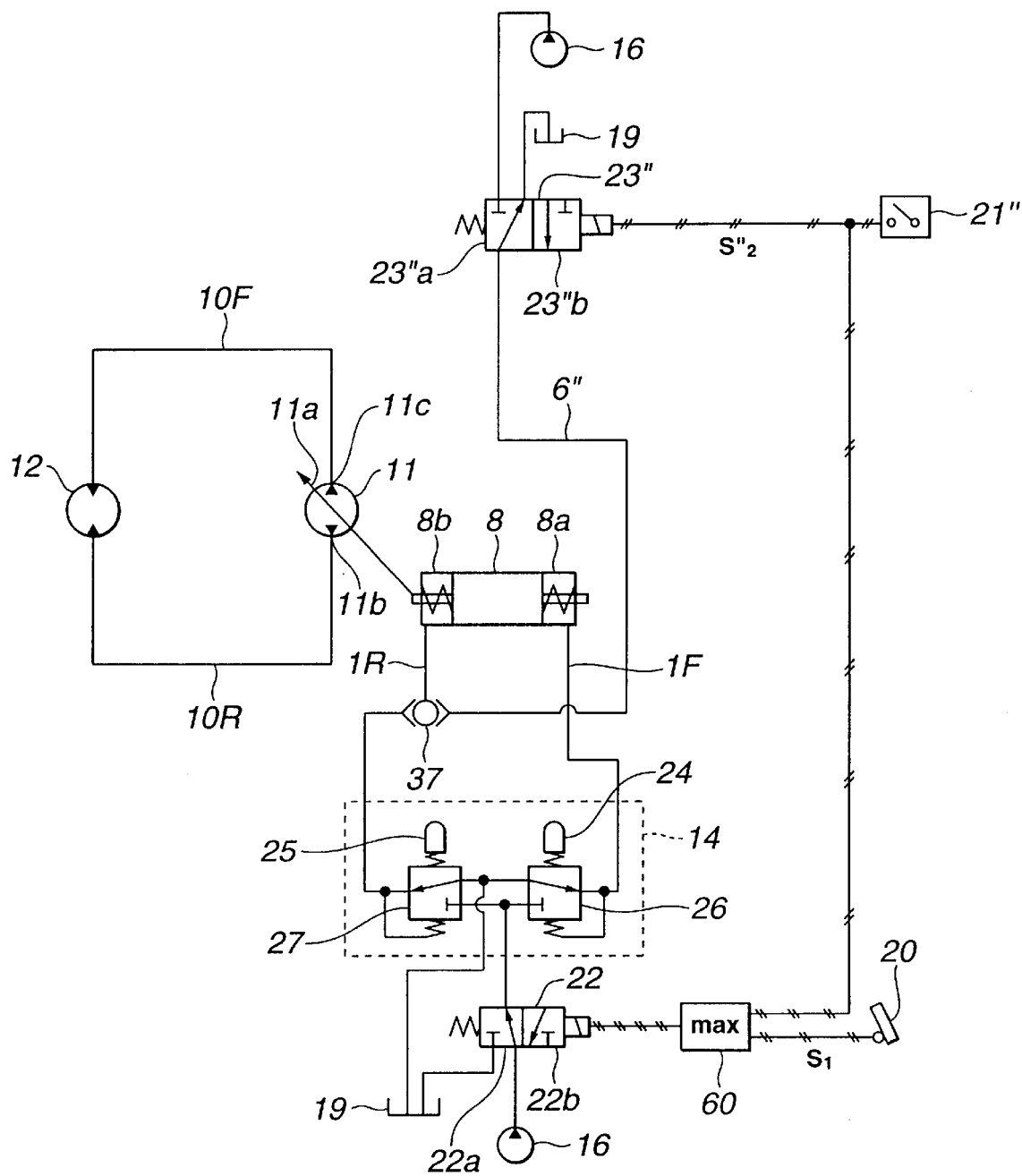
FIG. 7 is a hydraulic circuit diagram of a seventh embodiment.

FIG. 7 is a hydraulic circuit diagram of the seventh embodiment.

In this embodiment, in the same way as the hydraulic circuit shown in FIG. 5, the switch 21", the external signal control valve 23" and the external signal oil passage 6" are disposed instead of the emergency brake switch 21, the emergency brake control valve 23 and the emergency brake signal oil passage 6.

Respective pressure receiving chambers 8a, 8b are disposed at both ends of the piston 8 of this embodiment.

The operation lever device 14 is comprised of the pistons 24, 25 and the reducing valves 26, 27 corresponding to the pistons 24, 25. An outlet of the reducing valve 26 is communicated with the pressure receiving chamber 8a of the piston 8 through the oil passage 1F. The pilot pressure oil discharged from the pilot pump 16 as the piston 24 is displaced is reduced its pressure by the reducing valve 26 and supplied to the pressure receiving chamber 8a of the piston 8 through the oil passage 1F.

One inlet of the shuttle valve 37 is communicated with the outlet of the reducing valve 27. The other inlet of the shuttle valve 37 is communicated with the external signal oil passage 6". The outlet of the shuttle valve 37 is communicated with the pressure reducing chamber 8b of the piston 8 through the oil passage 1R.

The pressure oil of the pressure receiving chamber 8a of the piston 8 acts in a direction that the displacement of the hydraulic pump 11 in the forward direction increases, and the pressure oil of the pressure receiving chamber 8b of the piston 8 acts in a direction that the displacement of the hydraulic pump 11 in the reverse direction increases.

Therefore, the hydraulic circuit of FIG. 7 operates as follows.

Specifically, it is assumed that the switch 21" is turned on when the piston 8 is operating to tilt the swash plate 11a of the hydraulic pump 11 to the maximum displacement side in the forward direction. When the switch 21" is turned on, the external signal control valve 23" is switched to the valve position 23"b. And, when the switch 21" is turned on, the service brake control valve 22 is switched to the valve position 22b, and the pressure supplied to the reducing valves 26, 27 of the operation lever device 14 becomes zero.

When the external signal control valve 23" is switched to the valve position 23"b, the external signal pressure is applied from the pilot pump 16 to the inlet of the shuttle valve 37 through the external signal oil passage 6".

Here, the pressure in the tank 19 is applied to the other inlet of the shuttle valve 37. The external signal pressure is higher than the pressure in the tank. Therefore, the external signal pressure is output from the outlet of the shuttle valve 37 and applied to the pressure receiving chamber 8b of the piston 8 through the oil passage 1R.

The pressure of the pilot pressure oil supplied to the pressure receiving chamber 8a of the piston 8 is reduced by the reducing valve 26, so that it is lower than the discharge pressure of the pilot pump 16. The pressure may by reduced by the reducing valve 24 to lower the output pressure of the reducing valve 24 to a level lower than the discharge pressure of the pilot pump 16, and the pressure supplied to the reducing valve 24 may be made zero by the external signal.

Meanwhile, the external signal pressure supplied to the pressure receiving chamber 8b of the piston 8 is always the discharge pressure of the pilot pump 16.

Therefore, the force acting on the pressure receiving chamber 8b becomes higher than the force acting on the pressure receiving chamber 8a side of the piston 8, and the piston 8 is positioned to have the maximum displacement in the reverse direction. Thus, the swash plate 11a of the hydraulic pump 11 is tilted to the maximum displacement side in the reverse direction quickly with good responsivity.

As described above, according to the embodiment, when the external signal S"2 is instructed, the swash plate 11a of the two-way flow type hydraulic pump 11 can be forcedly positioned in the maximum displacement position in the reverse direction. The swash plate 11a of the hydraulic pump 11 may be forcedly positioned in the maximum displacement position in the forward direction. In this case, the shuttle valve 37 may be connected to the oil passage 1F instead of the oil passage 1R.

Then, the eighth embodiment will be described with reference to FIG. 8.

In the hydraulic circuits shown in FIG. 2 and FIG. 3, the control valve 23 was used as a valve for controlling the emergency hydraulic brake and also as a valve for controlling the mechanical brake. In this embodiment, the emergency brake control valve 23 is disposed as a valve to exclusively control the emergency hydraulic brake, and mechanical brake control valve 23' is disposed independent of the emergency brake control valve 23 as a valve for exclusively controlling the mechanical brake.

The emergency brake controlling valve 23 is connected to the piston 8 through the emergency brake signal oil passage 6.

Discharge control valve 40 is disposed on the oil passage 33. The discharge control valve 40 is disposed to control the discharge of the pressure oil from the cylinder chamber 18a of the brake cylinder 18.

The mechanical brake control valve 23' is connected to the brake cylinder 18 through the throttle 31, the check valve 30, the discharge control valve 40 and the hydraulic passage 33.

The emergency brake control valve 23 and the mechanical brake control valve 23' are switched to the brake operation positions 23b, 23'b upon entry of the emergency brake signal S2. When the emergency brake signal S2 is not entered the emergency brake control valve 23 and the mechanical brake control valve 23', they are switched to the brake release positions 23a, 23'a.

The discharge control valve 40 has valve positions 40a, 40b. The pilot port of the discharge control valve 40 is communicated with the neutral signal detection oil passage 32. One end of the oil passage 39 is connected to the neutral signal detection oil passage 32. The other end of the oil passage 39 is connected to the pipe between the throttle 31 and the mechanical brake control valve 23'. The oil passage 39 is disposed to allow the pressure oil passing through the neutral signal detection oil passage 32 to be released partly to the tank 19. The oil passage 39 is provided with throttle

38. The throttle 38 functions as a resistance to the pressure oil passing through the oil passage 39.

When the pilot pressure is applied to the pilot port of the discharge control valve 40, the discharge control valve 40 is switched to the valve position 40a. When the discharge control valve 40 is switched to the valve position 40a, the discharge control valve 40 is communicated with the throttle 31. Meanwhile, when the pilot pressure is not applied to the pilot port of the discharge control valve 40, the discharge control valve 40 is switched to the valve position 40b. When the discharge control valve 40 is switched to the valve position 40b, the discharge control valve 40 is communicated with the tank 19.

Therefore, the hydraulic circuit of FIG. 8 operates as follows.

When the emergency brake switch 21 is turned on, the emergency brake signal S2 is entered the emergency brake control valve 23, the mechanical brake control valve 23' and the service brake control valve 22.

Therefore, the emergency brake control valve 23 is positioned in the brake operation position 23b. Therefore, the emergency brake signal pressure is applied from the pilot pump 16 to the piston 8 through the emergency brake control valve 23 and the emergency brake signal oil passage 6. As a result, the piston 8 returns to the neutral position 8c quickly with good responsivity.

Meanwhile, when the emergency brake signal S2 is entered the mechanical brake control valve 23', the mechanical brake control valve 23' is positioned in the brake operation position 23'b.

At this time, if the piston 8 is positioned somewhere other than the neutral position 8c, the emergency brake signal pressure is output to the check valve 28 or 29. Therefore, the pressure oil of the emergency brake signal pressure is supplied to the neutral signal detection oil passage 32. This pressure oil is partly divided from the neutral signal detection oil passage 32 to the oil passage 39. The pressure oil divided to the oil passage 39 is discharged to the tank 19 through the mechanical brake control valve 23'. The throttle 38 on the oil passage 39 functions as a resistance to the pressure oil passing through the oil passage 39.

Therefore, the pressures of the neutral signal detection oil passage 32 and the oil passage 39 do not become a level of the pressure in the tank 19, and the discharge control valve 40 is positioned in the valve position 40a. In other words, the pressure oil supplied to the neutral signal detection oil passage 32 is partly applied to the pilot port of the discharge control valve 40. When the pilot pressure is applied to the pilot port of the discharge control valve 40, the discharge control valve 40 is switched to the valve position 40a.

When the discharge control valve 40 is switched to the valve position 40a, the discharge control valve 40 is communicated with the throttle 31.

Therefore, the pressure oil in the cylinder chamber 18a of the brake cylinder 18 is gradually discharged to the tank 19 through the oil passage 33, the discharge control valve 40, the throttle 31 and the mechanical brake control valve 23'.

When the piston 8 is positioned in the neutral position 8c, the emergency brake signal pressure is interrupted by the piston 8. Therefore, the pressure oil is not supplied from the check valves 28, 29 to the discharge control valve 40 through the neutral signal detection oil passage 32.

When the pilot pressure is not applied to the pilot port of the discharge control valve 40, the discharge control valve 40 is switched to the valve position 40b. When the discharge control valve 40 is switched to the valve position 40b, the discharge control valve 40 is communicated with the tank 19.

Therefore, the pressure oil in the cylinder chamber 18a of the brake cylinder 18 is discharged to the tank 19 through the oil passage 33 and the discharge control valve 40. The pressure oil in the cylinder chamber 18a of the brake cylinder 18 is discharged to the tank 19 without passing through the throttle 31, so that the pressure oil of the brake cylinder 18 is thoroughly discharged to the tank 19 in a short time.

When the piston 8 is positioned in the neutral position 8c, the pressure oil in the cylinder chamber 18a of the brake cylinder 18 is thoroughly discharged in a short time, and the mechanical brake becomes effective.

Figure 9:
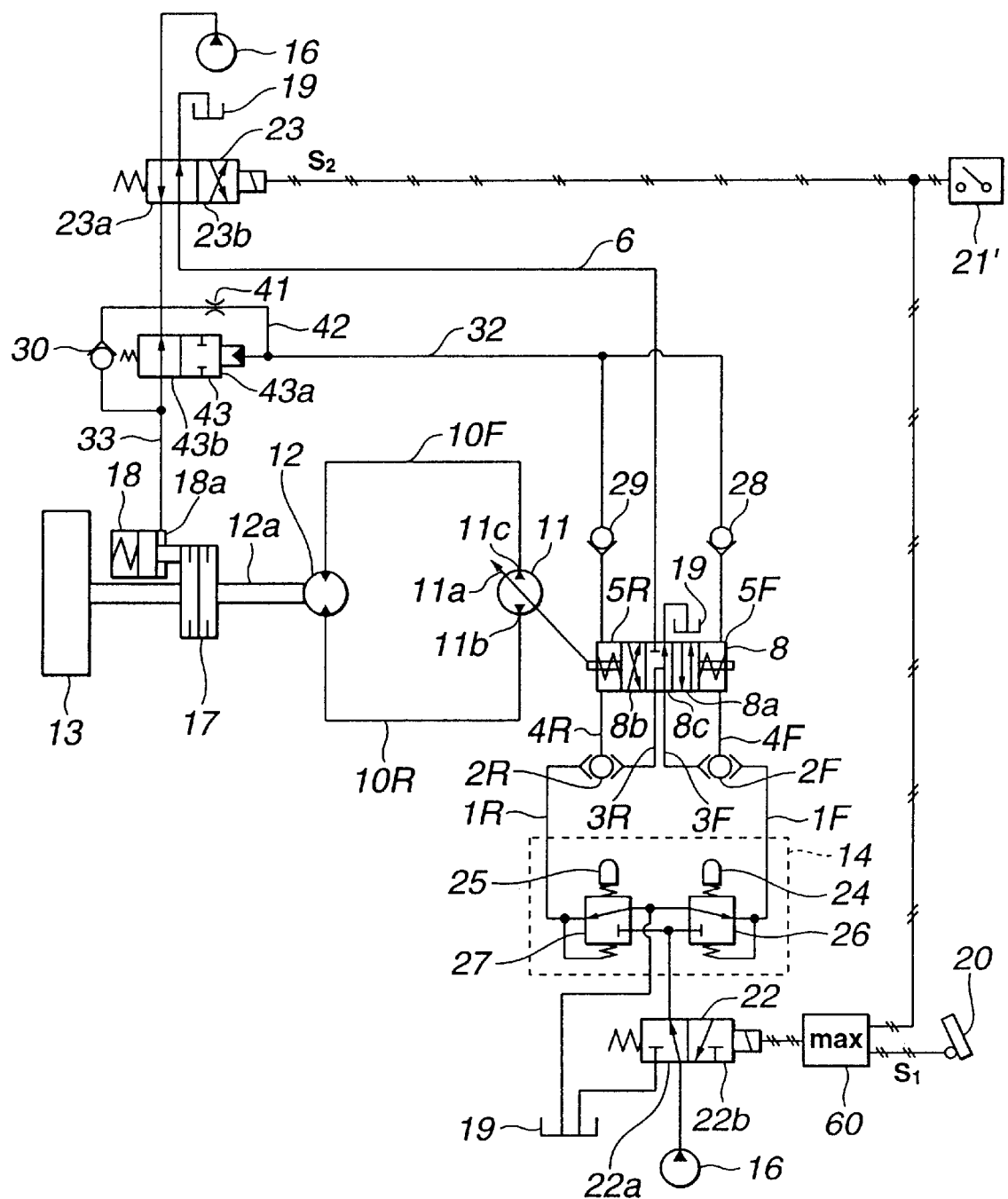
FIG. 9 is a hydraulic circuit diagram of a ninth embodiment.

Then, the ninth embodiment will be described with reference to FIG. 9.

In this embodiment, the discharge control valve 43 is disposed at a position corresponding to that of the throttle 31 of FIG. 2 and FIG. 3. Discharge control valve 43 is disposed to control the discharge of the pressure oil from the cylinder chamber 18a of the brake cylinder 18.

The discharge control valve 43 has valve positions 43a, 43b. The pilot port of the discharge control valve 43 is communicated with the neutral signal detection oil passage 32. One end of the oil passage 42 is connected to the neutral signal detection oil passage 32. The other end of the oil passage 42 is connected to the pipe between the discharge control valve 43 and the emergency brake control valve 23. The oil passage 42 is disposed to allow the pressure oil passing through the neutral signal detection oil passage 32 to be partly released to the tank 19. The oil passage 42 is provided with throttle 41. The throttle 41 functions as a resistance to the pressure oil passing through the oil passage 42.

When the pilot pressure is applied to the pilot port of the discharge control valve 43, the discharge control valve 43 is switched to the valve position 43a. When the discharge control valve 43 is switched to the valve position 43a, the pressure oil of the oil passage 33 is stopped by the discharge control valve 43. But, when the pilot pressure is not applied to the pilot port of the discharge control valve 43, the discharge control valve 43 is switched to the valve position 43b.

Therefore, the hydraulic circuit of FIG. 9 operates as follows.

When the emergency brake switch 21 is turned on, the emergency brake signal S2 is entered the emergency brake control valve 23 and the service brake control valve 22.

Therefore, the emergency brake control valve 23 is positioned in the brake operation position 23b. Thus, the emergency brake signal pressure is applied from the pilot pump 16 to the piston 8 through the emergency brake control valve 23 and the emergency brake signal oil passage 6. As a result, the piston 8 returns to the neutral position 8c quickly with good responsivity.

When the piston 8 is positioned somewhere other than the neutral position 8c, the emergency brake signal pressure is output from the check valve 28 or 29. Therefore, the pressure oil of the emergency brake signal pressure is supplied to the neutral signal detection oil passage 32. This pressure oil is partly divided from the neutral signal detection oil passage 32 to the oil passage 42. The pressure oil divided to the oil passage 42 is discharged to the tank 19 through the emergency brake control valve 23. The throttle 41 on the oil passage 42 functions as a resistance to the pressure oil passing through the oil passage 42.

Therefore, the pressure of the neutral signal detection oil passage 32 does not have a level of the pressure in the tank 19, and the discharge control valve 43 has the valve position 43a, and the mechanical brake remains released. Namely, the pressure oil supplied to the neutral signal detection oil passage 32 is partly applied to the pilot port of the discharge control valve 43. When the pilot pressure is applied to the pilot port of the discharge control valve 43, the discharge control valve 43 is switched to the valve position 43a.

When the discharge control valve 43 is switched to the valve position 43a, the pressure oil in the oil passage 33 is stopped by the discharge control valve 43.

Therefore, the pressure oil in the cylinder chamber 18a of the brake cylinder 18 is not discharged to the tank 19. In other words, when the piston 8 is positioned somewhere other than the neutral position 8c and the emergency hydraulic brake is effective, the mechanical brake does not operate.

When the piston 8 is positioned in the neutral position 8c, the emergency brake signal pressure is stopped by the piston 8. Therefore, the pressure oil is not supplied from the check valves 28, 29 to the discharge control valve 43 through the neutral signal detection oil passage 32.

When the pilot pressure is not applied to the pilot port of the discharge control valve 43, the discharge control valve 43 is switched to the valve position 43b. When the discharge control valve 43 is switched to the valve position 43b, the oil passage 33 is communicated with the tank 19. The pressure oil in the cylinder chamber 18a of the brake cylinder 18 is discharged to the tank 19 through the oil passage 33, the discharge control valve 43 and the emergency brake control valve 23. The pressure oil in the cylinder chamber 18a of the brake cylinder 18 is quickly discharged to the tank 19 thoroughly.

Therefore, when the piston 8 is position in the neutral position 8c to substantially stop the vehicle, the pressure oil in the cylinder chamber 18a of the brake cylinder 18 is swiftly discharged thoroughly and the mechanical brake becomes effective.

Then, the tenth embodiment will be described with reference to FIG. 10.

In the hydraulic circuits shown in FIG. 2, FIG. 3, FIG. 8 and FIG. 9, the emergency hydraulic brake and the mechanical brake are controlled by the oil pressure signal. In this embodiment, controller 44 is disposed to control the emergency hydraulic brake and the mechanical brake by an electrical signal.

Figure 8:
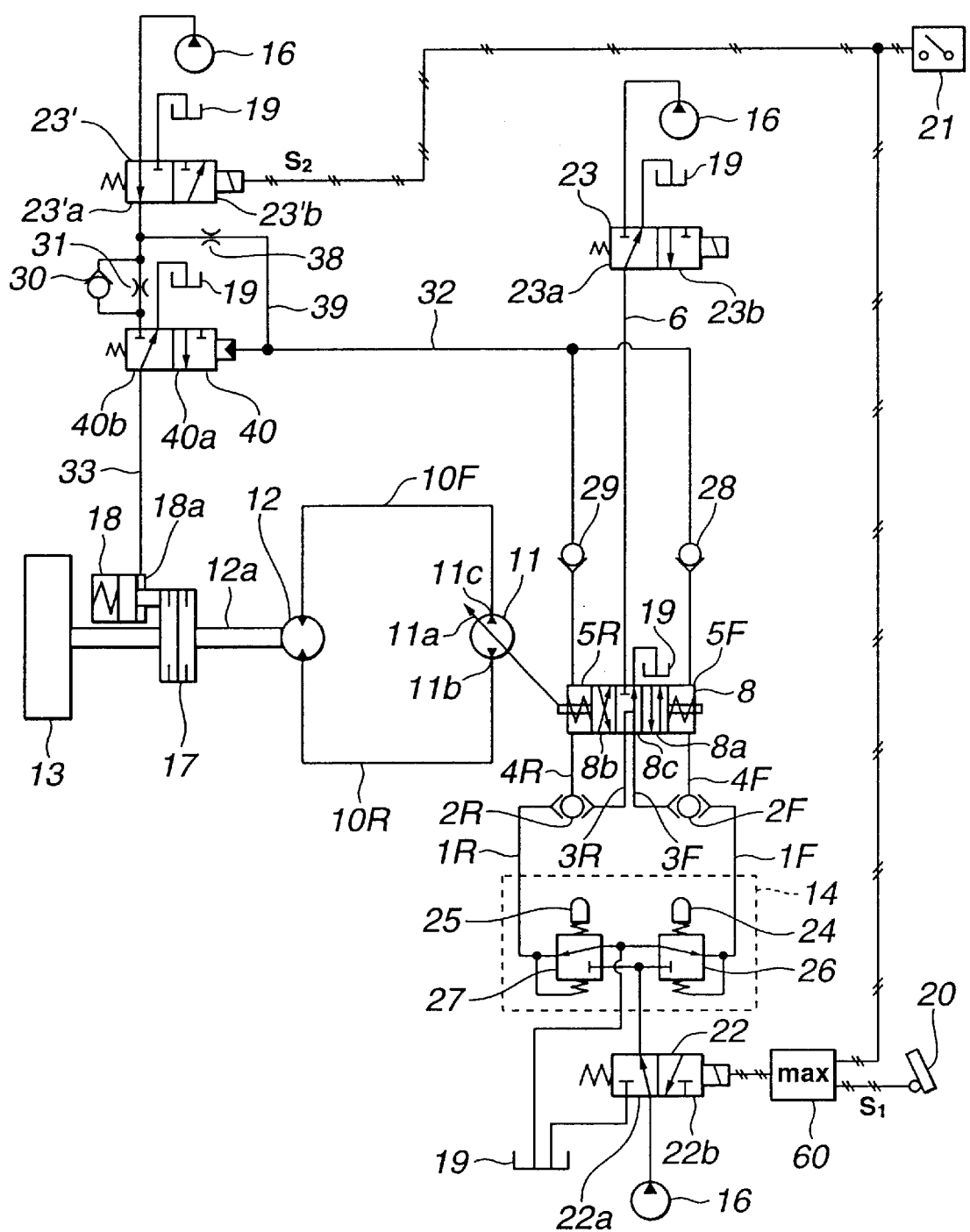
FIG. 8 is a hydraulic circuit diagram of an eighth embodiment.

In the same way as the hydraulic circuit of FIG. 8, the emergency brake control valve 23 is disposed as a valve for exclusively controlling the emergency hydraulic brake, and the mechanical brake control valve 23' is disposed independent of the emergency brake control valve 23 as a valve for exclusively controlling the mechanical brake.

The emergency brake control valve 23 is connected to the piston 8 through the emergency brake signal oil passage 6. The emergency brake signal S2 is entered the emergency brake control valve 23 from the controller 44.

The piston 8 is provided with stroke sensor 70 for detecting a stroke position of the piston 8. Stroke signal S3 indicating the stroke position detected by the stroke sensor 70 is entered the controller 44 as an electrical signal. A sensor for detecting a neutral position of the piston 8 may be used instead of the stroke sensor 70.

The mechanical brake control valve 23' is connected to the brake cylinder 18 through the oil passage 33. The mechanical brake signal S'2 is entered from the controller 44 to the mechanical brake control valve 23'.

When the emergency brake signal S2 is entered, the emergency brake control valve 23 is switched to the brake operation position 23b. When the emergency brake signal S2 is not entered the emergency brake control vale 23, it is switched to the brake release position 23a. Meanwhile, the mechanical brake control valve 23' is switched to the brake operation position 23'b when the mechanical brake signal S'2 is entered. When the mechanical brake signal S'2 is not entered the mechanical brake control valve 23', it is switched to the brake release position 23'a.

The hydraulic circuit of FIG. 10 operates as follows.

First, the controller 44 enters the emergency brake signal S2 into the emergency brake control valve 23. Thus, the emergency brake control valve 23 is positioned in the brake operation position 23b. And, the emergency brake signal pressure is applied from the pilot pump 16 to the piston 8 through the emergency brake control valve 23 and the emergency brake signal oil passage 6. As a result, the piston 8 is quickly returned to the neutral position 8c with good responsivity.

It is detected by the stroke sensor 70 that the piston 8 has stroked to the neutral position 8c, and the stroke signal S3 is entered the controller 44.

When the stroke signal S3 is entered, the controller 44 enters the mechanical brake signal S'2 into the mechanical brake control valve 23'. Therefore, the mechanical brake control valve 23' is positioned in the brake operation position 23'b. The pressure oil in the cylinder chamber 18a of the brake cylinder 18 is thoroughly discharged to the tank 19 in a short time through the oil passage 33 and the mechanical brake control valve 23'.

As described above, the piston 8 is positioned in the neutral position 8c to make the emergency hydraulic brake effective, and the pressure oil in the cylinder chamber 18a of the brake cylinder 18 is completely discharged in a short time, and the mechanical brake becomes effective.

Figure 11:
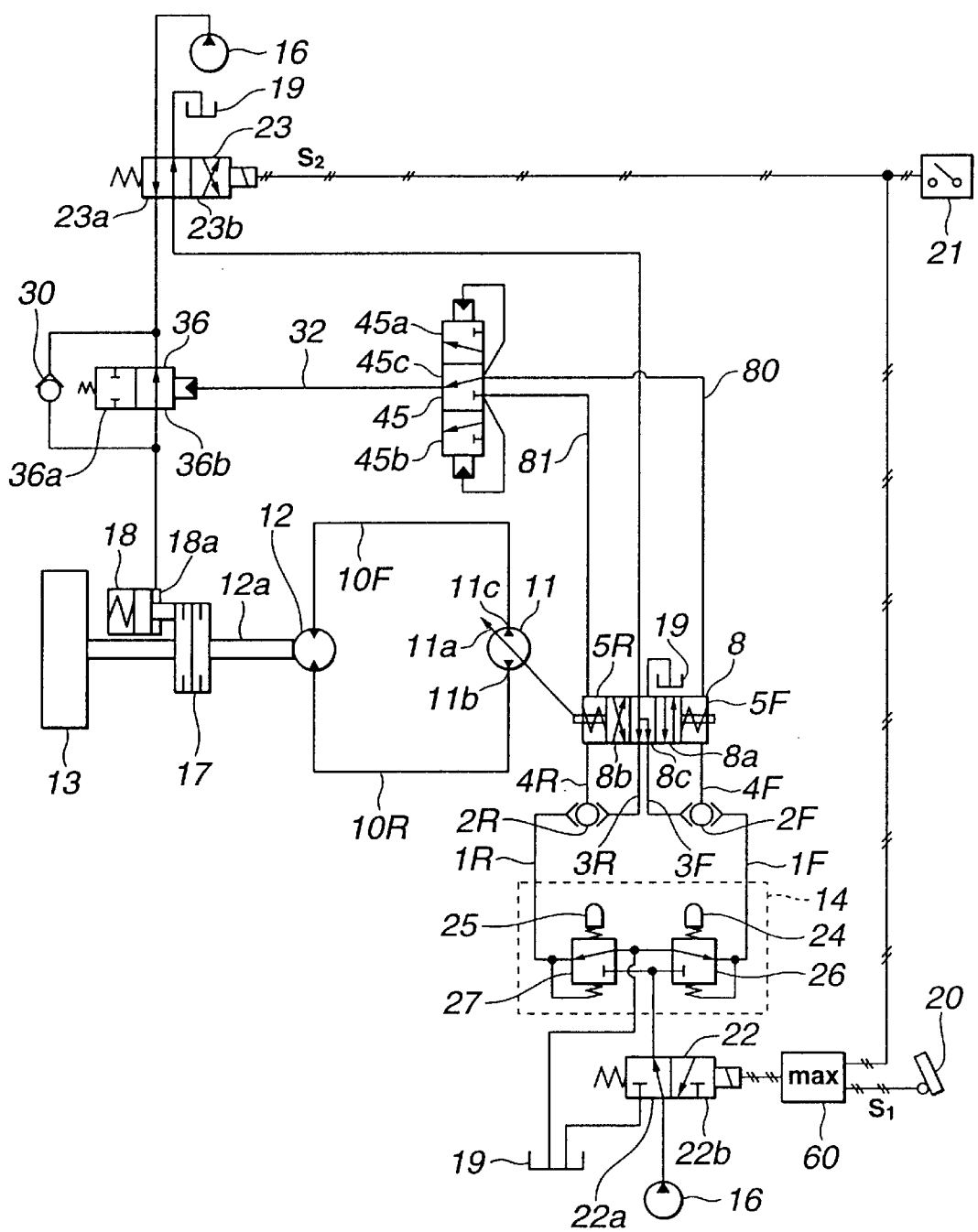
FIG. 11 is a hydraulic circuit diagram of an eleventh embodiment.

Then, the eleventh embodiment will be described with reference to FIG. 11.

When the pistons 8 of FIG. 2, FIG. 3, FIG. 8 and FIG. 9 are positioned in the neutral position 8c, the pressures of the pressure receiving chambers 5F, 5R of the piston 8 have a level equivalent to the pressure in the tank 19. In this embodiment, in the same way as the piston 8 of FIG. 1, when the piston 8 is positioned in the neutral position 8c, the pressures of the pressure receiving chambers 5F, 5R of the piston 8 have the same level as the emergency brake signal pressure, namely the discharge pressure of the pilot pump 16. The pressure receiving chambers 5F, SR of the piston 8 are connected to oil passages 80, 81. The oil passages 80, 81 are connected to the neutral signal detection oil passage 32 through neutral signal detection valve 45.

Therefore, when the piston 8 is positioned in the neutral position 8c, the emergency brake signal pressure is output as a neutral signal to the oil passages 80, 81. When the piston 8 is positioned somewhere other than the neutral position 8c, the pressure oil is output to one of the oil passages 80, 81 but not to the other.

The neutral signal detection valve 45 is disposed on the neutral signal detection oil passage 32. The neutral signal detection valve 45 has three valve position 45a, 45b, 45c. When the pressure oil is output to the oil passage 80 but not to the oil passage 81, the neutral signal detection valve 45 is switched to the valve position 45a. Thus, the oil passage 81 is communicated with the neutral signal detection oil passage 32, and the pressure in the neutral signal detection oil passage 32 becomes zero. Similarly, when the pressure oil is output to the oil passage 81 but not to the oil passage 80, the neutral signal detection valve 45 is switched to the valve position 45b. Thus, the oil passage 80 is communicated with the neutral signal detection oil passage 32, and the pressure in the neutral signal detection oil passage 32 becomes zero.

Meanwhile, when the pressure oil is output to the oil passages 80, 81, the neutral signal detection valve 45 is switched to the valve position 45c. Thus, the oil passage 80 is communicated with the neutral signal detection oil passage 32, and the pressure in the neutral signal detection oil passage 32 becomes high (discharge pressure of the pilot pump 16).

In this embodiment, the control valve 36 is disposed in the same way as the hydraulic circuit of FIG. 4. The pilot port of the control valve 36 is communicated with the neutral signal detection oil passage 32.

Then, the operation of the hydraulic circuit of FIG. 11 will be described.

Specifically, when the piston 8 is positioned somewhere other than the neutral position 8c, the pressure oil is output to one of the oil passages 80 and 81 and not output to the other one. Therefore, the neutral signal detection valve 45 is positioned in the valve position 45a or 45b, and the pressure in the neutral signal detection oil passage 32 becomes zero. Because the pressure of the neutral signal detection oil passage 32 is zero, the pilot pressure is not applied to the pilot port of the control valve 36 through the neutral signal detection oil passage 32. Therefore, the control valve 36 is positioned in discharge cut-off position 36a. When the control valve 36 is positioned in the discharge cut-off position 36a, the pressure oil in the cylinder chamber 18a of the brake cylinder 18 is intercepted by the control valve 36 and not discharged to the tank 19. Thus, a state that the mechanical brake is released is maintained.

When the piston 8 is positioned in the neutral position 8c, the pressure oil is output to the oil passages 80 and 81. Therefore, the neutral signal detection valve 45 is positioned in the valve position 45c, and the pressure in the neutral signal detection oil passage 32 becomes high (discharge pressure of the pilot pump 16). Thus, the pilot pressure is applied to the pilot port of the control valve 36 through the neutral signal detection oil passage 32.

Accordingly, the control valve 36 is positioned in the discharge position 36b. When the control valve 36 is positioned in the discharge position 36b, the pressure oil in the cylinder chamber 18a of the brake cylinder 18 is discharged to the tank 19 through the oil passage 33, the control valve 36 and the emergency brake control valve 23.

After the emergency hydraulic brake operates as described above to position the piston 8 in the neutral position 8c, the mechanical brake operates.

Then, the twelfth embodiment will be described with reference to FIG. 12.

In the hydraulic circuit shown in FIG. 8, the pressure oil passing through the neutral signal detection oil passage 32 is released through the oil passage 39. But, the pressure oil which is divided from the neutral signal detection oil passage 32 and discharged from the oil passage 39 to the tank 19 has a large discharge loss. In this embodiment, the discharge loss of the pressure oil from the neutral signal detection oil passage 32 can be eliminated. A configuration different from the hydraulic circuit of FIG. 8 will be described.

Figure 12:
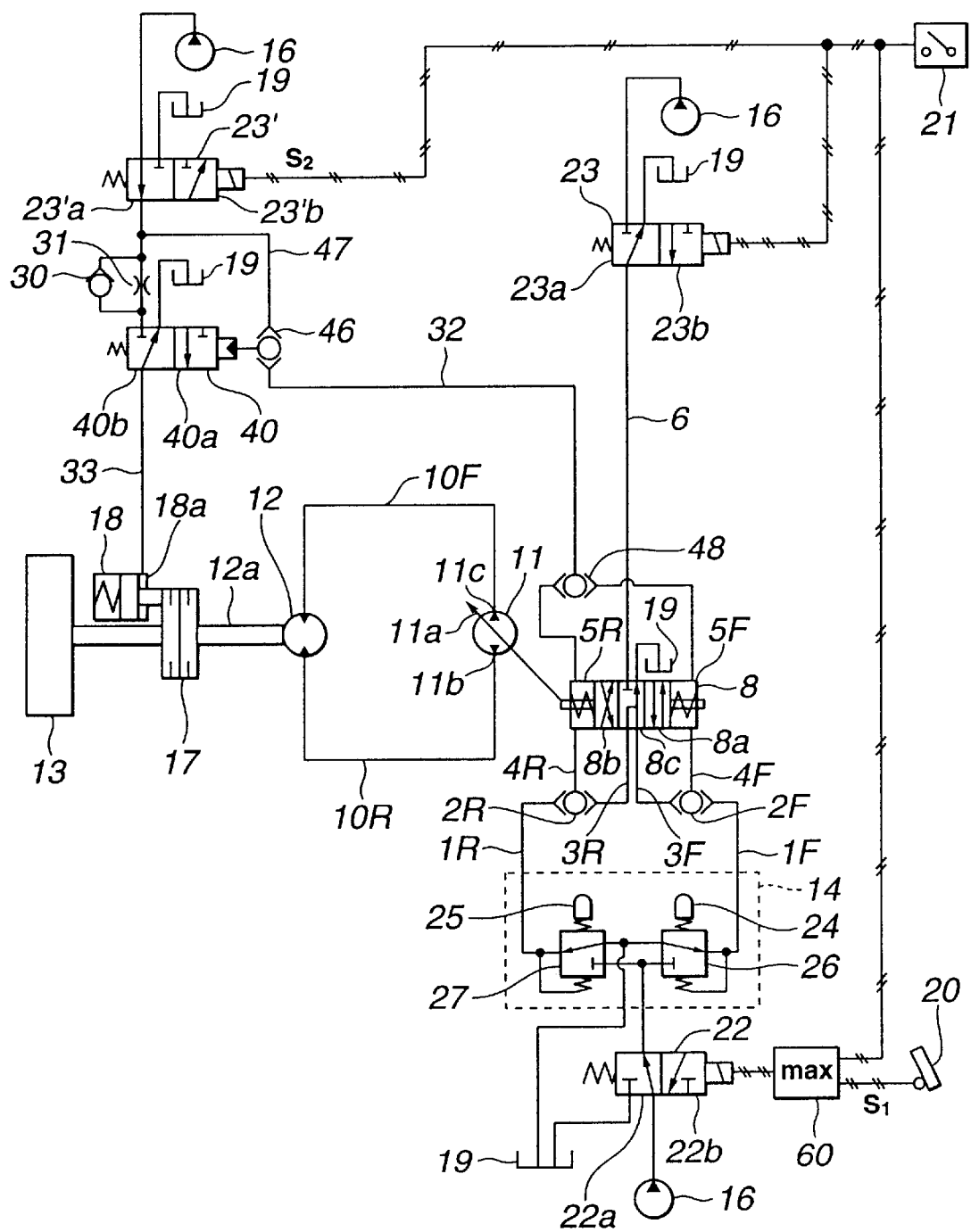
FIG. 12 is a hydraulic circuit diagram of a twelfth embodiment.

Specifically, in the hydraulic circuit of FIG. 12, shuttle valve 48 is disposed instead of the check valves 28, 29 of FIG. 8. Higher one between the pressures of the pressure receiving chambers 5F, 5R is output from the outlet of the shuttle valve 48. The outlet of the shuttle valve 48 is communicated with the neutral signal detection oil passage 32. The neutral signal detection oil passage 32 is communicated with one of the inlets of shuttle valve 46. The other inlet of the shuttle valve 46 is connected to one end of oil passage 47. The other end of the oil passage 47 is connected to the outlet of the throttle 31. The outlet of the shuttle valve 46 is communicated with the pilot port of the discharge control valve 40.

The hydraulic circuit of FIG. 12 operates as follows.

When the emergency brake switch 21 is turned on, the emergency brake signal S2 is entered the emergency brake control valve 23 and the mechanical brake control valve 23'.

Therefore, the emergency brake control valve 23 is positioned in the brake operation position 23b. Thus, the emergency brake signal pressure is applied from the pilot pump 16 to the piston 8 through the emergency brake control valve 23 and the emergency brake signal oil passage 6. As a result, the piston 8 is quickly returned to the neutral position 8c with good responsivity.

Meanwhile, when the emergency brake signal S2 is entered the mechanical brake control valve 23', the mechanical brake control valve 23' is positioned in the brake operation position 23'b.

At this time, if the piston 8 positioned somewhere other than the neutral position 8c, the emergency brake signal pressure is output from the shuttle valve 48. Accordingly, the pressure oil of the emergency brake signal pressure is supplied to the neutral signal detection oil passage 32. The pressure oil is guided to one of the inlets of the shuttle valve 46 through the neutral signal detection oil passage 32. Thus, the pilot pressure is applied from the outlet of the shuttle valve 46 to the pilot port of the discharge control valve 40.

When the pilot pressure is applied to the pilot port of the discharge control valve 40, the discharge control valve 40 is switched to the valve position 40a. When the discharge control valve 40 is switched to the valve position 40a, the discharge control valve 40 is communicated with the throttle 31.

Therefore, the pressure oil in the cylinder chamber 18a of the brake cylinder 18 is gradually discharged to the tank 19 through the oil passage 33, the discharge control valve 40, the throttle 31 and the mechanical brake control valve 23'.

When the piston 8 is positioned in the neutral position 8c, the emergency brake signal pressure is interrupted by the piston 8. Therefore, the supply of the pressure oil from the outlet of the shuttle valve 48 to the neutral signal detection oil passage 32 is stopped. The oil passage 47 is communicated with the tank 19 through the mechanical brake control valve 23'. Thus, the pressure at the inlet of the shuttle valve 46 is decreased, and the pilot pressure is not applied from the outlet of the shuttle valve 46 to the pilot port of the discharge control valve 40.

When the pilot pressure is not being applied to the pilot port of the discharge control valve 40, the discharge control valve 40 is switched to the valve position 40b. When the discharge control valve 40 is switched to the valve position 40b, the discharge control valve 40 is communicated with the tank 19.

Therefore, the pressure oil in the cylinder chamber 18a of the brake cylinder 18 is discharged to the tank 19 through the oil passage 33 and the discharge control valve 40. The pressure oil in the cylinder chamber 18a of the brake cylinder 18 is thoroughly discharged to the tank 19 in a short time because it is discharged to the tank 19 without passing through the throttle 31.

When the piston 8 is moved in the direction of the neutral position 8c, the pressure oil in the cylinder chamber 18a of the brake cylinder 18 is thoroughly discharged in a short time, and the mechanical brake becomes effective.

In this embodiment, the shuttle valve 46 is disposed to guide the pressure oil passing through the neutral signal detection oil passage 32 to the pilot port of the discharge control valve 40. Therefore, the pressure oil passing through the neutral signal detection oil passage 32 is not discharged to the tank 19 through the oil passage 47 when the piston 8 is positioned somewhere other than the neutral position 8c. As a result, an outflow loss can be eliminated compared with the embodiment of FIG. 8.

The thirteenth embodiment will be described with reference to FIG. 13.

Figure 13:
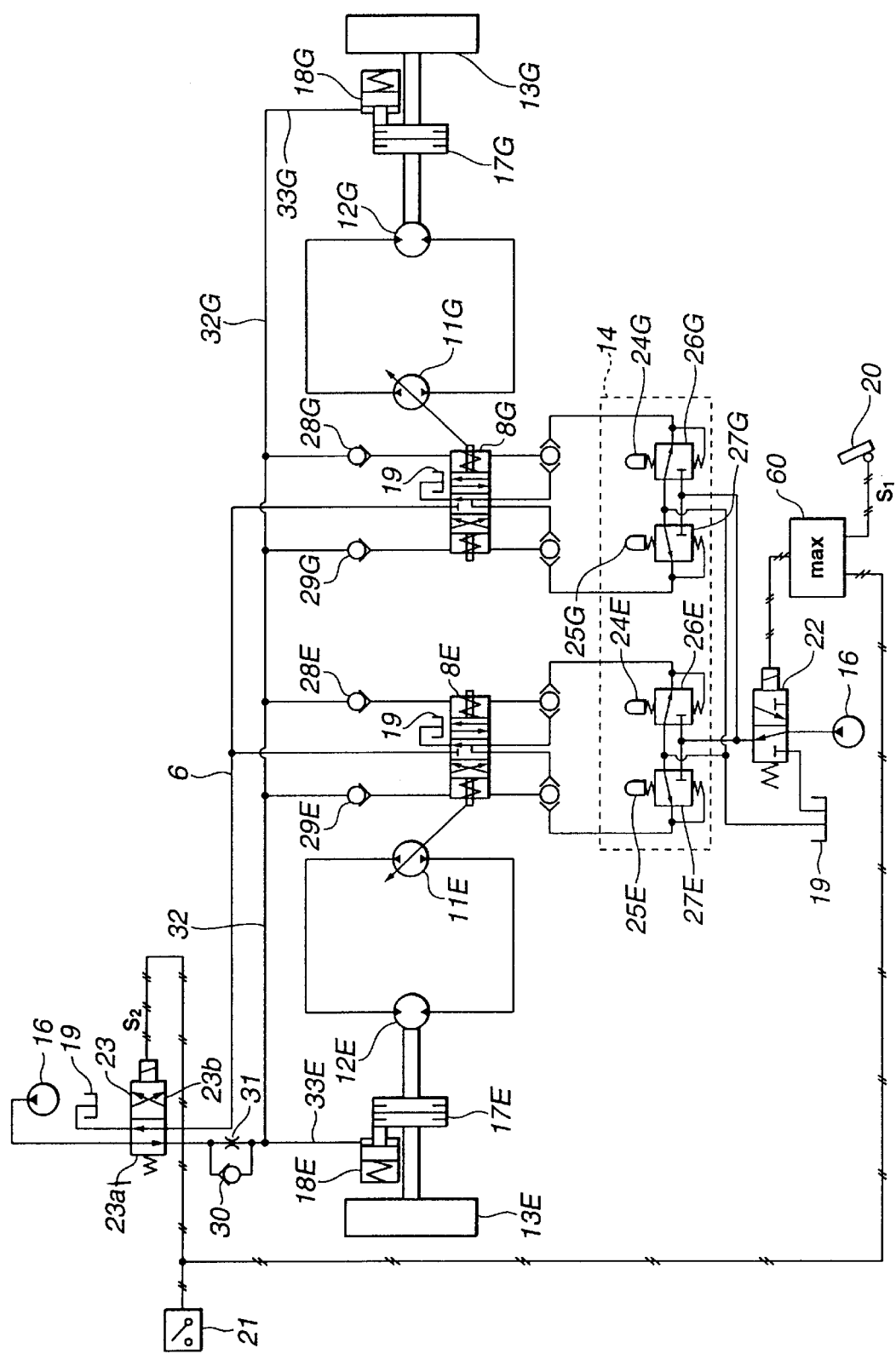
FIG. 13 is a hydraulic circuit diagram of a thirteenth embodiment.

The hydraulic circuit shown in FIG. 13 is provided with two hydraulic pumps. For example, it is assumed that left and right crawler belts 13E, 13G are driven by left and right hydraulic pumps 11E, 11G. The hydraulic circuit of FIG. 13 has the same configuration as the hydraulic circuit of FIG. 2 does. In FIG. 13, E is added to left side components (for the left crawler belt), and G is added to right side components (for the right crawler belt). And, the same structure as that of FIG. 2 will not be described unless necessary.

Specifically, check valves 28E, 29E for the left crawler belt and check valves 28G, 29G for the right crawler belt are communicated with the neutral signal detection oil passage 32 as shown in FIG. 13. The neutral signal detection oil passage 32 is communicated with oil passage 33E for the left crawler belt and oil passage 33G for the right crawler belt. In the same way as the hydraulic circuit of FIG. 2, the oil passage 33E is connected to the pilot pump 16 and the tank 19 through the check valve 30, the throttle 31 and the emergency brake control valve 23.

Therefore, the hydraulic circuit of FIG. 13 operates as follows.

When the emergency brake signal S2 is not entered the emergency brake control valve 23, the emergency brake control valve 23 is positioned in the brake release position 23a. Therefore, the pilot pressure oil discharged from the pilot pump 16 is supplied to the left crawler belt brake cylinder 18E through the emergency brake control valve 23, the check valve 30 and the left crawler belt oil passage 33E. When the pilot pressure oil is supplied to the left crawler belt brake cylinder 18E, the left crawler belt brake member 17E is released, and the left crawler belt 13E can rotate freely.

The pilot pressure oil discharged from the pilot pump 16 is supplied to the right crawler belt brake cylinder 18G through the emergency brake control valve 23, the check valve 30, the neutral signal detection oil passage 32 and the right crawler belt oil passage 33G. When the pilot pressure oil is supplied to the right crawler belt brake cylinder 18G, the right crawler belt brake member 17G is released, and the right crawler belt 13G can rotate freely. Namely, the mechanical brake does not operate and the vehicle can move forward or backward.

When the emergency brake switch 21 is turned on, the emergency brake signal S2 is entered the emergency brake control valve.

When the emergency brake signal S2 is entered the emergency brake control valve 23, the emergency brake control valve 23 is positioned in the brake operation position 23b. Therefore, the pilot pressure oil is supplied from the pilot pump 16 to the emergency brake oil passage 6 through the emergency brake control valve 23. Thus, the emergency brake signal pressure is applied to the left and right pistons 8E, 8G through the emergency brake signal oil passage 6. Thus, the left and right pistons 8E, 8G are quickly returned to the neutral position with good responsivity. Thus, the emergency hydraulic brake of the vehicle operates to make the vehicle speed zero.

When the emergency brake signal S2 is entered the emergency brake control valve 23, the pressure oil in the left crawler belt brake cylinder 18E is discharged to the tank 19 through the left crawler belt oil passage 33E, the throttle 31 and the emergency brake control valve 23. When the pressure oil is substantially discharged from the left crawler belt brake cylinder 18E, the left crawler belt brake member 17E operates to stop the rotation of the left crawler belt 13E.

When the emergency brake signal S2 is entered the emergency brake control valve 23, the pressure oil in the right crawler belt brake cylinder 18G is discharged to the tank 19 through the right crawler belt oil passage 33G, the neutral signal detection oil passage 32, the throttle 31 and the emergency brake control valve 23. When the pressure oil is substantially discharged from the right crawler belt brake cylinder 18G, the right crawler belt brake member 17G operates to stop the rotation of the right crawler belt 13G. Thus, the mechanical brake of the vehicle becomes effective.

Then, a relation between the time between engaging the emergency hydraulic brake and dropping the vehicle speed to zero and the time before the mechanical brake becomes effective will be described.

When at least one of the left and right pistons 8E, 8G is positioned somewhere other than the neutral position, the emergency brake signal pressure is output from either the left crawler belt check valves 28E, 29E and the right crawler belt check valves 28G, 29G, and the pressure oil is supplied to the neutral signal detection oil passage 32. The pressure oil supplied to the neutral signal detection oil passage 32 is supplied to the left and right oil passages 33E, 33G. Thus, the pressures in the left and right oil passages 33E, 33G are suppressed from lowering when the pressure oil is discharged from the left and right brake cylinders 18E, 18G. Namely, when the emergency hydraulic brake is engaging, time before the mechanical brake operates is extended.

When both the left and right pistons 8E, 8G are positioned in the neutral position, the emergency brake signal pressure is interrupted by the left and right pistons 8E, 8G. Therefore, the pressure oil is prevented from being supplied from the left crawler belt check valves 28E, 29E and the right crawler belt check valves 28G, 29G to the left and right oil passages 33E, 33G through the neutral signal detection oil passage 32.

Subsequently, the pressures of the left and right oil passages 33E, 33G are gradually decreased, and the pressure oils in the left and right brake cylinders 18E, 18G are thoroughly discharged to the tank 19 through the throttle 31. Therefore, in a predetermined time after both the left and right pistons 8E, 8G are positioned in the neutral position and the emergency hydraulic brake engages, the pressure oils in the left and right brake cylinders 18E, 18G are thoroughly discharged, and the mechanical brake engages.

Then, the fourteenth embodiment will be described with reference to FIG. 14.

Figure 14:
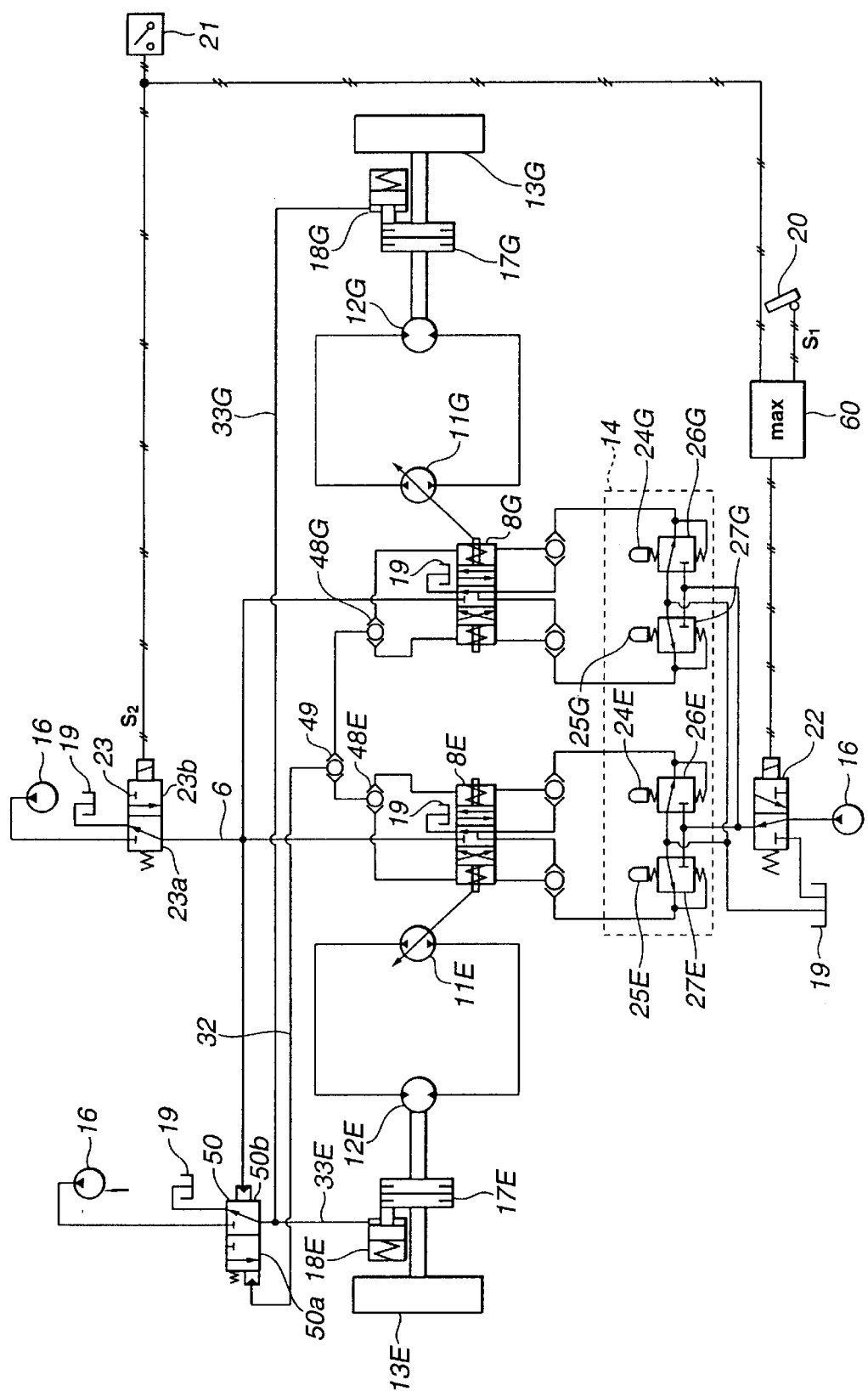
FIG. 14 is a hydraulic circuit diagram of a fourteenth embodiment.

The hydraulic circuit shown in FIG. 14 is provided with two hydraulic pumps in the same way as the hydraulic circuit of FIG. 13. For example, it is assumed that the left and right crawler belts 13E, 13G are driven by the left and right hydraulic pumps 11E, 11G. The hydraulic circuit of FIG. 14 has the same structure as that of the hydraulic circuit of FIG. 12. In FIG. 14, E is added to the components of the left side (for the left crawler belt) and G for the components of the right side (for the right crawler belt), and the same components as those of FIG. 12 will not be described unless necessary.

Figure 10:
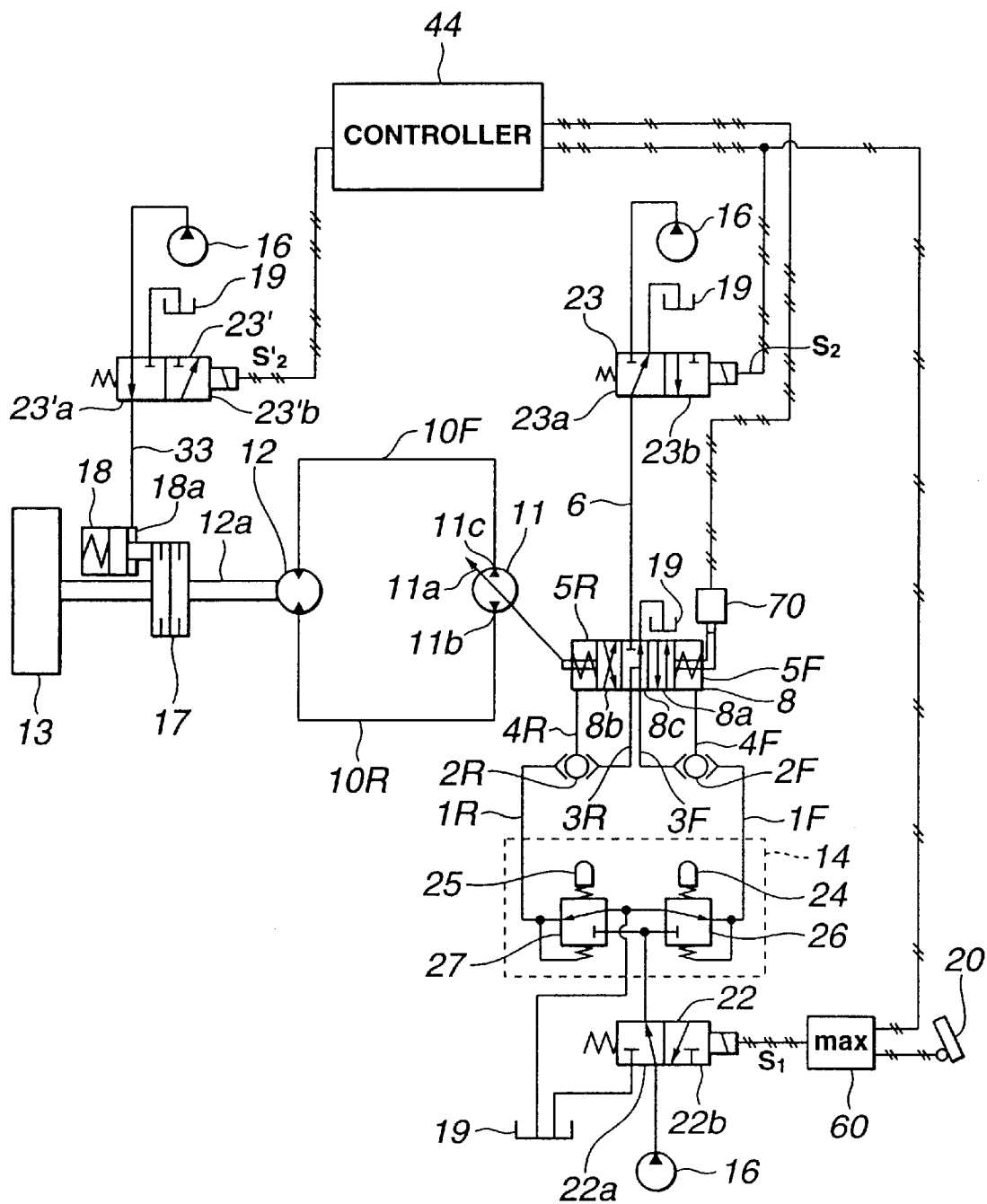
FIG. 10 is a hydraulic circuit diagram of a tenth embodiment.

Different from the hydraulic circuits shown in FIG. 8, FIG. 10 and FIG. 12, the mechanical brake control valve 23' is omitted.

Specifically, outlets of left crawler belt shuttle valve 48E and right crawler belt shuttle valve 48G are communicated with the inlets of shuttle valve 49 as shown in FIG. 14. The outlet of the shuttle valve 49 is communicated with the neutral signal detection oil passage 32. The neutral signal detection oil passage 32 is communicated with one of the pilot ports (on the left side in the drawing) of the discharge control valve 50. The emergency brake signal oil passage 6 is communicated with the other pilot port (on the right side in the drawing) of discharge control valve 50. The left crawler belt oil passage 33E and the right crawler belt oil passage 33G are connected to the discharge control valve 50. When the pilot pressure is being applied to the right and left pilot ports of the discharge control valve 50, the discharge control valve 50 is positioned in the valve position 50a. When the discharge control valve 50 is positioned in the valve position 50a, the left and right oil passages 33E, 33G are communicated with the pilot pump 16 through the discharge control valve 50. When the pilot pressure is applied to the pilot port on the right side in the drawing of the discharge control valve 50 but not to the pilot port on the left side in the drawing, the discharge control valve 50 is positioned in the valve position 50b. When the discharge control valve 50 is positioned in the valve position 50b, the left and right oil passages 33E, 33G are communicated with the tank 19 through the discharge control valve 50.

The hydraulic circuit of FIG. 14 operates as follows.

When the emergency brake switch 21 is turned on, the emergency brake signal S2 is entered the emergency brake control valve 23.

Therefore, the emergency brake control valve 23 is positioned in the brake operation position 23b. Thus, the emergency brake signal pressure is applied from the pilot pump 16 to the left and right pistons 8E, 8G through the emergency brake control valve 23 and the emergency brake signal oil passage 6. As a result, the left and right pistons 8E, 8G are quickly returned to the neutral position with good responsivity. The pilot pressure is applied to the pilot port on the right side in the drawing of the discharge control valve 50 through the emergency brake signal oil passage 6.

At this time, when at least one of the left and right pistons 8E, 8G is positioned somewhere other than the neutral position, the emergency brake signal pressure is output from the shuttle valve 49. Therefore, the pressure oil of the emergency brake signal pressure is supplied to the neutral signal detection oil passage 32. This pressure oil is guided to the pilot port on the left side in the drawing of the discharge control valve 50 through the neutral signal detection oil passage 32.

When the pilot pressure is applied to the right and left pilot ports in the drawing of the discharge control valve 50, the discharge control valve 50 is switched to the valve position 50a. When the discharge control valve 50 is switched to the valve position 50a, the left and right oil passages 33E, 33G are communicated with the pilot pump 16 through the discharge control valve 50. Therefore, the pressure oil in the left and right brake cylinders 18E, 18g are not discharged. In other words, when at least one of the left and right pistons 8E, 8G is positioned somewhere other than the neutral position and the emergency hydraulic brake is operating, the mechanical brake does not operate.

When both the left and right pistons 8E, 8G are positioned in the neutral position, the emergency brake signal pressure is interrupted by the left and right piston 8E, 8G. Therefore, the pressure oil is not supplied from the outlet of the shuttle valve 49 to the neutral signal detection oil passage 32. Thus, the pilot pressure oil is not guided to the pilot port on the left side in the drawing of the discharge control valve 50 through the neutral signal detection oil passage 32.

When the pilot pressure is applied to the pilot port on the right side in the drawing of the discharge control valve 50 but not to the pilot port on the left side in the drawing, the discharge control valve 50 is switched to the valve position 50b. When the discharge control valve 50 is switched to the valve position 50b, the left and right oil passages 33E, 33G are communicated with the tank 19 through the discharge control valve 50.

Thus, the pressure oils in the left and right brake cylinders 18E, 18G are discharged to the tank 19 through the left and right oil passages 33E, 33g and the discharge control valve 50. The pressure oils in the left and right brake cylinders 18E, 18G are thoroughly discharged to the tank 19 in a short time.

As described above, when the left and right pistons 8E, 8G are positioned in the neutral position and the emergency hydraulic brake is engaged, the pressure oils in the left and right brake cylinders 18E, 18G are thoroughly discharged in a short time, and the mechanical brake is engaged.

Then, the fifteenth embodiment will be described with reference to FIG. 15.

Figure 15:
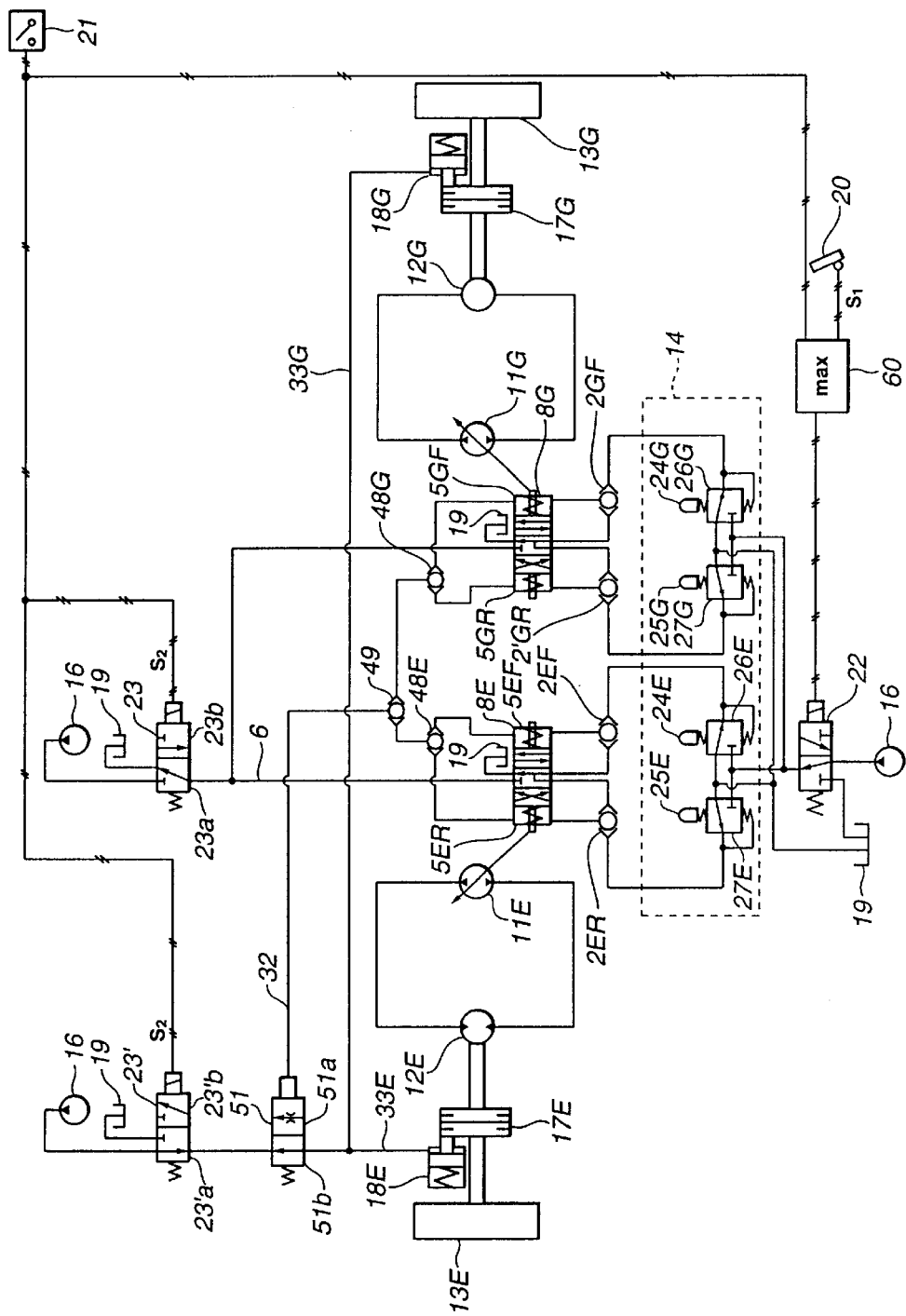
FIG. 15 is a hydraulic circuit diagram of a fifteenth embodiment.

The hydraulic circuit shown in FIG. 15 is provided with two hydraulic pumps in the same way as the hydraulic circuits of FIG. 13, FIG. 14. For example, it is assumed that the left and right crawler belts 13E, 13G are driven by the left and right hydraulic pumps 11E, 11G. In FIG. 15, E is added to the components on the left side (for the left crawler belt) and G to the components on the right side (for the right crawler belt).

Specifically, the respective outlets of the shuttle valve 48E for the left crawler belt and the shuttle valve 48G for the right crawler belt are communicated with the inlet of the shuttle valve 49. The outlet of the shuttle valve 49 is communicated with the neutral signal detection oil passage 32. The neutral signal detection oil passage 32 is communicated with the pilot port of discharge control valve 51.

The left crawler belt oil passage 33E and the right crawler belt oil passage 33G are connected to the discharge control valve 51. When the pilot pressure is being applied to the pilot port of the discharge control valve 51, the discharge control valve 51 is positioned in valve position 51a. When the discharge control valve 51 is positioned in the valve position 51a, the left and right oil passages 33E, 33G are communicated with the control valve 23 for the mechanical brake through the throttle in the discharge control valve 51. When the pilot pressure is not being applied to the pilot port of the discharge control valve 51, the discharge control valve 51 is positioned in valve position 51b. When the discharge control valve 51 is positioned in the valve position 51b, the left and right oil passages 33E, 33G are directly communicated with the mechanical brake control valve 23' without through the throttle in the discharge control valve 51.

The hydraulic circuit of FIG. 15 operates as follows.

When the emergency brake switch 21 is turned on, the emergency brake signal S2 is entered the emergency brake control valve 23 and the mechanical brake control valve 23'.

Thus, the emergency brake control valve 23 is positioned in the brake operation position 23b. The emergency brake signal pressure is applied from the pilot pump 16 to the left and right pistons 8E, 8G through the emergency brake control valve 23 and the emergency brake signal oil passage 6. As a result, the left and right pistons 8E, 8G are quickly returned to the neutral position with good responsivity.

Meanwhile, when the emergency brake signal S2 is entered the mechanical brake control valve 23', the mechanical brake control valve 23' is positioned in the brake operation position 23'b.

At this time, when at least one of the left and right pistons 8E, 8G is positioned somewhere other than the neutral position, the emergency brake signal pressure is output from the shuttle valve 49. Therefore, the pressure oil of the emergency brake signal pressure is supplied to the neutral signal detection oil passage 32. This pressure oil is guided to the pilot port of the discharge control valve 51 through the neutral signal detection oil passage 32.

When the pilot pressure is applied to the pilot port of the discharge control valve 51, the discharge control valve 51 is switched to the valve position 51a. When the discharge control valve 51 is switched to the valve position 51a, the left and right oil passages 33E, 33G are communicated with the mechanical brake control valve 23' through the throttle in the discharge control valve 51.

Therefore, the pressure oils in the left and right brake cylinders 18E, 18G are discharged to the tank 19 through the throttle in the discharge control valve 51. Thus, the pressure oils in the left and right brake cylinders 18E, 18G are discharged gradually to the tank 19. In other words, when at least one of the left and right pistons 8E, 8G is positioned somewhere other than the neutral position and the emergency hydraulic brake is engaged, the mechanical brake does not operate.

When both the left and right pistons 8E, SG are positioned in the neutral position, the emergency brake signal pressure is interrupted by the left and right pistons 8E, 8G. Therefore, the pressure oil is not supplied from the outlet of the shuttle valve 49 to the neutral signal detection oil passage 32. Thus, the pilot pressure oil is not guided to the pilot port of the discharge control valve 51 through the neutral signal detection oil passage 32.

When the pilot pressure is not applied to the pilot port of the discharge control valve 51 the discharge control valve 51 is switched to the valve position 51b. When the discharge control valve 51 is switched to the valve position 51b, the left and right oil passages 33E, 33G are directly communicated with the mechanical brake control valve 23' without through the throttle in the discharge control valve 51.

Therefore, the pressure oils in the left and right brake cylinders 18E, 18g are discharged to the tank 19 without passing through the throttle. The pressure oils in the left and right brake cylinders 18e, 18g are discharged to the tank 19 without passing through the throttle, so that the pressure oils in the left and right brake cylinders 18E, 18G are thoroughly discharged to the tank 19 in a short time.

When the left and right pistons 8E, 8G are moved in the direction of the neutral position as described above, the pressure oils in the left and right brake cylinders 18E, 18G are thoroughly discharged in a short time, and the mechanical brake is engaged.

Figure 16:
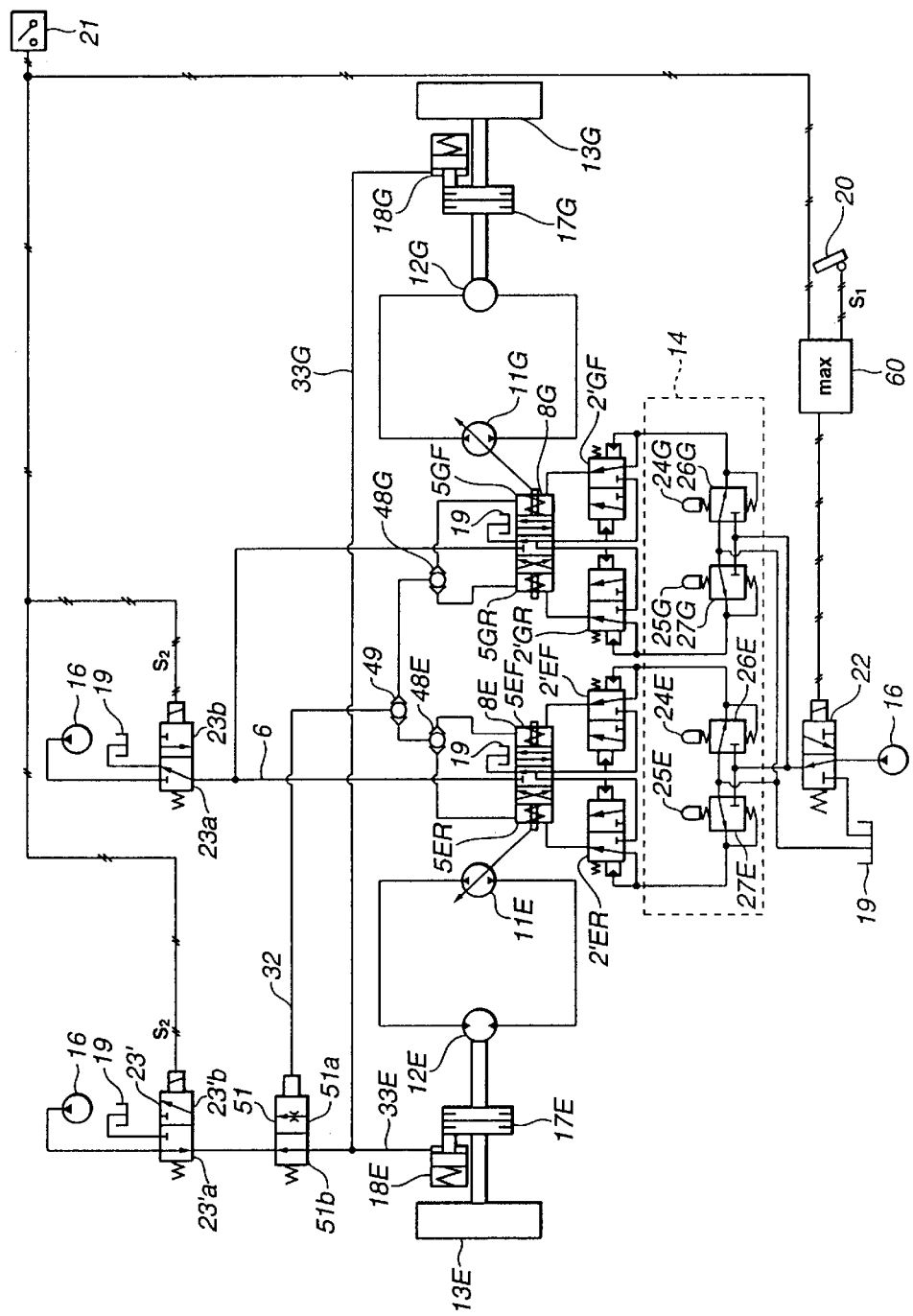
FIG. 16 is a hydraulic circuit diagram of a sixteenth embodiment.

FIG. 16 shows a modification of FIG. 15.

In the hydraulic circuit of FIG. 15, outlets of shuttle valves 2EF, 2ER are communicated with forward side pressure receiving chamber 5EF and reverse side pressure receiving chamber 5ER of the left side piston 8E, and outlets of shuttle valves 2GF, 2GR are communicated with forward side pressure receiving chamber 5GF and reverse side pressure receiving chamber 5GR of the right side piston 8G. But, switch valves 2'EF, 2'ER, 2'GF, 2'GR may be disposed instead of the shuttle valves 2EF, 2ER, 2GF, 2GR as shown in FIG. 16.

In a case of the switch valve 2'EF, when the output pressure of the reducing valve 26E is being applied to the pilot port on the right side in the drawing of the switch valve 2'EF, the switch valve 2'EF is switched to the valve position 2'a, and the output pressure of the reducing valve 26E is entered the forward side pressure receiving chamber 5EF of the left side piston 8E through the switch valve 2'EF. Meanwhile, when the emergency brake pressure is being applied to the pilot port on the left side in the drawing of the switch valve 2'EF through the emergency brake signal oil passage 6, the switch valve 2'EF is switched to the valve position 2'b, and the emergency brake pressure is entered the forward side pressure receiving chamber 5EF of the left side piston 8E through the switch valve 2'EF.

Because the switch valve is used instead of the shuttle valve as described above, the left side piston 8E is communicated with the reducing valves 24E, 25E without fail. The left side piston 8E is also communicated with the tank 19 without fail. Similarly, the right side piston 8G is also communicated with the reducing valves 24G, 25G and with the tank 19 without fail. Thus, there is obtained an effect of stabilizing the operation. In other words, the vehicle can run straight ahead stably without turning when it is traveling straight.

In the above embodiment, the oil pressure signal which is determined according to the control input of the operation lever 14a and the depressed level of the brake pedal 20 is entered as "first instruction signal" into the piston 8. But, the invention is not limited to the embodiment of entering the oil pressure signal directly into the piston 8. For example, an electromagnetic proportional control valve may be disposed to convert the electrical signal into the oil pressure signal before entering into the piston 8.

It was also described in the above embodiment assuming that the vehicle brake was controlled by controlling the displacement of the hydraulic pump 11.

But, the subject to be controlled by the invention is not limited to the vehicle brakes but may be applied as required. According to the present invention, the displacement of the hydraulic pump 11 can be forcedly changed to a desired displacement according to an instruction from a channel independent of the ordinary instruction, so that there is obtained an effect that the subject to be controlled can be moved to a desired position quickly with good responsivity.

What is claimed is:

1. A displacement control device for a hydraulic pump which is provided with a displacement control piston for changing a volume of pressure oil discharged from a hydraulic pump in response to a first instruction signal, and controls the volume of pressure oil discharged from the hydraulic pump by entering pressure oil in a volume corresponding to the first instruction signal into the displacement control piston, wherein:

displacement control means are disposed to control discharge of the pressure oil from the hydraulic pump in a volume corresponding to a second instruction signal, which is different from the first instruction signal, regardless of the input of the pressure oil in the volume corresponding to the first instruction signal by entering the pressure oil in a volume corresponding to the second instruction signal into the displacement control piston.

2. A brake control device for a hydraulic motor which is provided with a displacement control piston for changing a volume of pressure oil discharged from a hydraulic pump, a hydraulic motor which is driven by the pressure oil supplied from the hydraulic pump and brake means which brake a shaft of the hydraulic motor, controls the volume of pressure oil discharged from the hydraulic pump to control the drive of the hydraulic motor and also to control the braking by the brake means, wherein:

brake control means are disposed to control the displacement control piston to discharge the pressure oil in a minimum volume from the hydraulic pump by entering a brake instruction signal and also to control the brake means to brake the shaft of the hydraulic motor after the displacement of the hydraulic pump becomes minimum.

3. A brake control device for a hydraulic motor which is provided with a displacement control piston for changing a volume of pressure oil discharged from a hydraulic pump according to a first instruction signal, a hydraulic motor which is driven by the pressure oil supplied from the hydraulic pump and brake means which brake a shaft of the hydraulic motor, which controls the volume of pressure oil discharged from the hydraulic pump by entering the first instruction signal into the displacement control piston to control the drive of the hydraulic motor and also to control the braking by the brake means, wherein:

brake control means are disposed to control the displacement control piston so to discharge the pressure oil in a minimum amount from the hydraulic pump regardless of the entry of the first instruction signal by entering a brake instruction signal different from the first instruction signal and also to control the brake means so to brake the shaft of the hydraulic motor after the displacement of the hydraulic pump becomes minimum.

* * * * *